(12) United States Patent
Wagstaff et al.

(10) Patent No.: US 6,418,083 B1
(45) Date of Patent: Jul. 9, 2002

(54) PHASE FLUCTUATION BASED SIGNAL PROCESSOR

(75) Inventors: Ronald A. Wagstaff, Oxford, MS (US); Jackson A. Mobbs, Cabot, AR (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/759,765

(22) Filed: Jan. 12, 2001

(51) Int. Cl.⁷ .............................. H04B 1/06; G01S 3/80
(52) U.S. Cl. ..................... 367/135; 367/901; 367/124
(58) Field of Search ........................ 367/119, 135, 367/901, 124, 98; 708/321, 308; 342/196

(56) References Cited

U.S. PATENT DOCUMENTS

| | | | |
|---|---|---|---|
| 4,953,145 A | 8/1990 | Carlson | 367/138 |
| 4,992,998 A | 2/1991 | Woodward | 367/99 |
| 5,724,270 A | * 3/1998 | Posch | |
| 5,732,045 A | 3/1998 | Wagstaff | 367/135 |
| 5,886,951 A | 3/1999 | Wagstaff | 367/135 |
| 6,036,351 A | 3/2000 | Wagstaff | 367/724.18 |
| 6,104,672 A | 8/2000 | Wagstaff | 367/119 |
| 6,353,578 B1 | 3/2002 | Wagstaff | |
| 6,356,510 B1 | 3/2002 | Wagstaff | |

* cited by examiner

Primary Examiner—Ian J. Lobo
(74) Attorney, Agent, or Firm—John J. Karasek; Dorothy I. Becker

(57) ABSTRACT

A method for characterizing degree of phase fluctuation of a signal and a signal processor for accomplishing such characterization, is described, in which a time series of complex data vectors are received, initial spectral processing is accomplished, an estimate of the excess phase rotation is made, and a quantity WSC equal to $$WSC = \left[\frac{1}{M}\sum_{i=3}^{N} B[C\Phi_i]^L\right]$$

is calculated. Based on the different phase behavior of signal and noise, the quantity WSC is compared to a preset threshold value to determine whether the received signal is phase stable signal or whether it is noise or clutter. In another embodiment of the invention, the quantity WSC is used to modify the results of another signal processor to improve the signal to noise ratio of the other signal processor. For example, in one embodiment, the results of a processor based on the average signal amplitude AVGPR is divided by the quantity WSC raised to a real exponent, leading to a reduction in noise and easier discrimination of signals.

In other embodiments, the fluctuation of the amplitude of a received signal is characterized by determining a value $$WISPR = \left[\frac{1}{M}\sum_{i=3}^{N} r_i^{-2}\right]^{-1}.$$

Based on the behavior of noise/clutter compared to signal, the quantity WISPR is compared to a preset quantity to discriminate between noise and signal. In another embodiment of the invention, the quantity WISPR is divided by the quantity WSC raised to a real exponent.

35 Claims, 16 Drawing Sheets

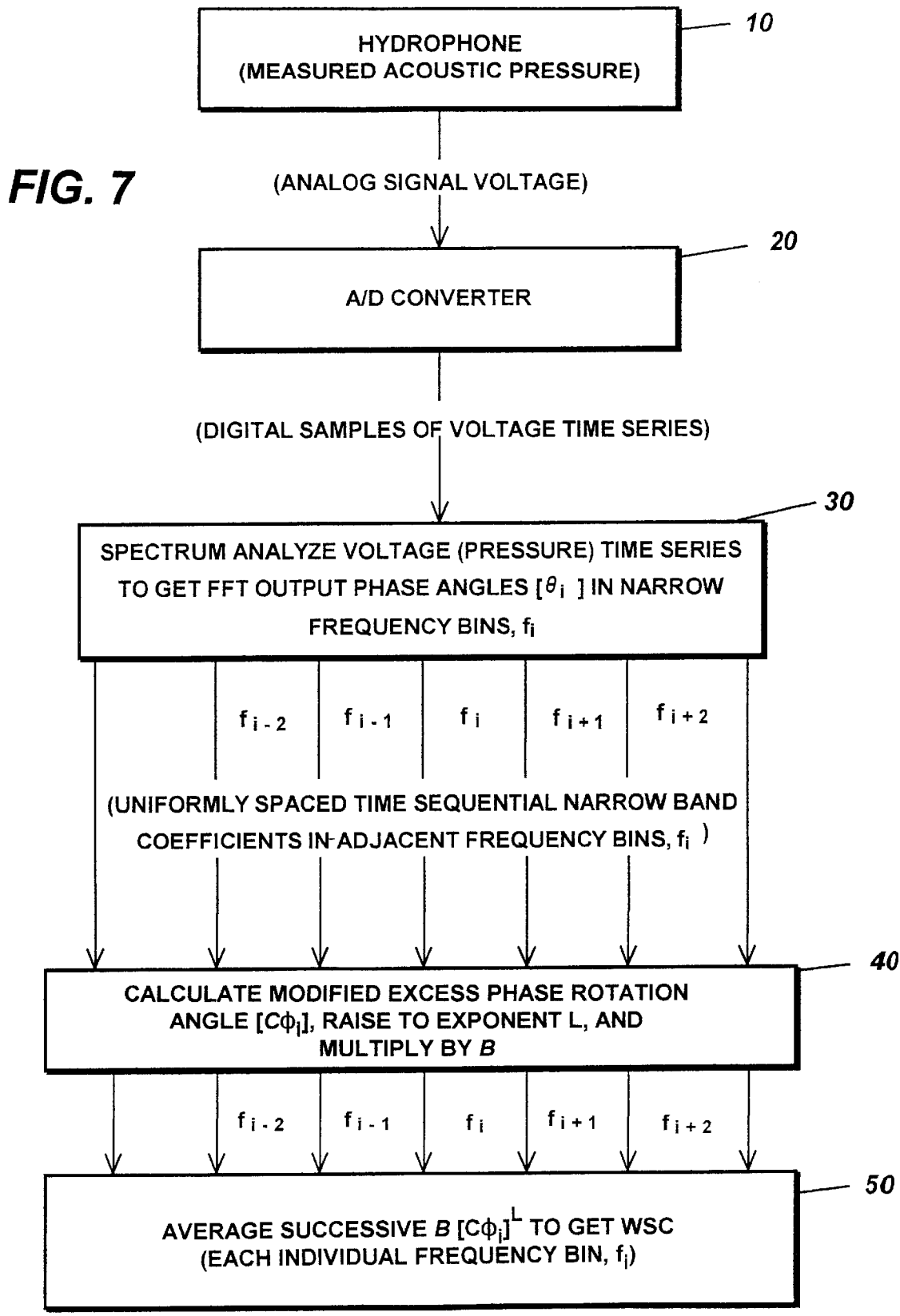

PHASE FLUCTUATION BASED SIGNAL PROCESSOR

BACKGROUND OF THE INVENTION

The present invention relates to a signal processing method for separating signals from noise and clutter signals, and more specifically to a signal processing method which identifies excess phase or amplitude shifts corresponding to noise and clutter signals.

Most signal processing technology used to differentiate between signals and noise and clutter concentrates on filtering higher amplitude inputs (assumed to be signals) from lower amplitude inputs (assumed to be noise). However, this method is effective only if the signal has a greater amplitude than the surrounding environmental noise. Signals with amplitudes approximately the same or less those that of the environment are extremely difficult to distinguish from noise.

Target detection and identification is very important in many applications, including the fields of underwater acoustics, radar processing, and infrared detection. As the signatures of mechanical systems decrease, signal processors which rely on identifying a signal of interest based on amplitude of the received signal alone lose their capability to distinguish between the signal of interest and noise. In this environment, increases in the signal to noise ratio of the signal processors become even more critical.

One method for increasing the signal to noise ratio of sinusoidal signals in random noise using a phase fluctuation approach is found in Wagstaff et al U.S. Pat. No. 6,353,578, which is incorporated herein in its entirety. Another method is described in U.S. Pat. No. 5,732,045, Fluctuations Based Digital Signal Processor Including Phase Variations issued to Wagstaff et al on Mar. 24, 1998, which is incorporated herein in its entirety. Another method is described in Wagstaff et al, U.S. Pat. No. 6,356,510, incorporated herein in its entirety. These phase based processors rely on an estimate of the excess phase rotation exhibited by a time series of data. The basis for these phase fluctuation processors is briefly described below.

The polar coordinate diagram of FIG. 1 illustrates the phase relationship between three consecutive samples of a complex vector quantity $R_{i-2}$, $R_{i-1}$, and $R_i$, which have amplitudes $r_{i-2}$, $r_{i-1}$, and $r_i$ and phase angles $\theta_{i-2}$, $\theta_{1-1}$, and $\theta_i$. Phase alignment of consecutive samples of the complex vector quantity relies on the expectation that for uniformly sampled data, the phase rotation of an i−2 th vector will have a uniform progression as it rotates to the next two sample positions, i−1 and i. A vector is said to have uniform progression if it has a constant angular velocity and zero angular acceleration. If the rotation rate is constant (has zero angular acceleration), the angular separation between the first two phase angles, $\theta_{i-2}-\theta_{i-1}$, should be equal to the angular separation between the second two phase angles, $\theta_{i-1}-\theta_i$. The expected phase angle of the i th vector, $\theta'_i$ will be equal to the second phase angle, $\theta_{i-1}$, plus the angular separation between the first and second phase angles, $\theta_{i-1}-\theta_{i-2}$ (and $\theta'_i=\theta_{i-1}+\theta_{i-1}-\theta_{i-2}=2\theta_{i-1}-\theta_{i-2}$). If the rotation rate is not constant, the fluctuation in the phase angle $\theta_i$ of the vector $R_i$ will result in an excess phase rotation, $\Phi_i$, which is equal to $\theta_i-\theta'_i$, the amount that the actual phase angle $\theta_i$ exceeds the expected phase angle $\theta'_i$.

A phase fluctuation based processor uses estimates of the excess phase rotation, $\Phi_i$, to measure the amount of phase fluctuation in a set of data. Note that the excess phase rotation is proportional to the angular acceleration. There are several methods to estimate the excess phase fluctuation, one of which is as follows:

If $$R_i=r_i e^{j\theta i}=r_i Cos\ \theta_i+jr_i Sin\ \theta_i=r_i Z_i, \quad \text{Equation (1)}$$

where $Z_i$ is the i th unit phasor, then $\Phi_i$, the excess phase rotation of the complex vector $R_i$, can be expressed as $$\Phi_i=\theta_i-\theta'_i=\theta_i-2\theta_{i-1}+\theta_{i-2} \quad \text{Equation (2)}$$

If $\Phi_i$ is within the domain $-\pi$ to $+\pi$, then $\Phi_i$ can be estimated by $\Phi_i=\theta_i-\theta'_i=\theta_i-2\theta_{i-1}+\theta_{i-2}$. The restriction to the range of $-\pi$ to $+\pi$ is necessary only when the values of $\Phi_i$ are used directly by themselves in later processing steps, for example when several values of $\Phi_i$ are averaged. When the value of $\Phi_i$ is transformed to a trigonometric or other function which is then used in later processing steps (such as when later processing steps compare values of cos $\Phi_i$) then $\Phi_i$ is not restricted to a particular range.

There are other methods which may be used for estimating the excess phase rotation $\Phi_i$. One is to assume a uniform progression of phase angles of one degree per sample i for the entire data set in a given frequency bin, then to calculate the average squared differences between the quadrature components of the modified and original data. For example, an averaged squared value $1/N\ \Sigma\ (\sin\ (\theta_i+1/180)-\sin\ \theta_i))$ for i=1 to N may be calculated for the modified phase angle ($\theta_i+1/180$ degrees). This process is repeated for two degrees per sample ($\theta_i+2/180$ degrees), three degrees per sample ($\theta_i+3/180$ degrees), and so on, through 179 degrees per sample. The accepted angle per sample is the one that gives the least average squared difference. The corresponding values of $\Phi_i$ are then the differences between the accepted modified phase angles and the original phase angles. A similar process could be used in which modified phase angles could be obtained by a phase-locked loop with corresponding differences giving the values of $\Phi_i$.

The set of excess phase rotation data, estimated by one of the above methods, can then be used as the basis for several types of phase fluctuation-based signal processors. Although other phase fluctuation based signal processors (i.e. those described in U.S. Pat. Nos. 6,353,578, 6,356,510, 5,732,045) exist, a phase based processor which is even simpler and more sensitive to low amplitude signals than those currently in use would be extremely useful in signal processing and target detection applications.

There is also a need to improve the performance of currently used signal processors, whether they rely on discriminating between signal and noise based on a comparison between the acoustic power level of a signal and acoustic level of noise, or on another method. These processors could be greatly enhanced by the addition of processing steps which differentiate between signal and noise based on the magnitude of phase fluctuation in the received data.

A very sensitive phase fluctuation based processor is developed herein which is computationally efficient and can be added easily to other existing signal processors to increase the signal to noise ratio for faint signals.

SUMMARY OF THE INVENTION

An object of the invention is to provide a signal processor which filters high phase fluctuation signals from small phase fluctuation signals in a computationally efficient way.

An object of the invention is to provide a signal processor which filters large amplitude fluctuation signals from small amplitude fluctuation signals.

An object of the invention is to improve the signal to noise ratio of existing signal processors.

An object of the invention is to enhance a signal processor which is based on the signal amplitude, fluctuation of the signal amplitude, or other signal characteristic, by adding steps for measuring the phase fluctuation of a set of data.

An object of the invention is to improve the performance of signal processors for signals that have small and medium phase fluctuations.

In accordance with these and other objects made apparent herein, the invention concerns a signal processor for accomplishing such characterization, is described, in which a time series of complex data vectors are received, initial spectral processing is accomplished, an estimate of the excess phase rotation is made, and a quantity WSC equal to $$WSC = \left[\frac{1}{M}\sum_{i=3}^{N} B[C\Phi_i]^L\right]$$

is calculated. The quantity WSC is compared to a preset threshold value to determine whether the received signal is phase stable signal or whether it is noise or clutter. In another embodiment of the invention, the quantity WSC is used to modify the results of another signal processor to improve the signal to noise ratio of the other signal processor. In one embodiment, the results of a processor based on the average signal amplitude AVGPR is divided by the quantity WSC raised to a real exponent, leading to a reduction in noise and easier discrimination of signals.

In another embodiment, the fluctuation of the amplitude of a received signal is characterized by determining a value $$WISPR = \left[\frac{1}{M}\sum_{i=3}^{N} r_i^{-2}\right]^{-1}.$$

The quantity WISPR is compared to a preset quantity to discriminate between noise and signal. In another embodiment of the invention, the quantity WISPR is divided by the quantity WSC raised to a real exponent. These signal processor embodiments much more effectively identify signals of interest than do currently available signal processors.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

FIG. 7 is a flow chart of a WSC processor for identifying low phase fluctuation acoustic signals.

DETAILED DESCRIPTION

A signal processor is described herein which receives time series of complex vector quantities in from a spectrum analyzer, and selectively attenuates or amplifies the received complex vector quantities based on the phase fluctuation of the signal, by attenuating the signals having large phase fluctuations and enhancing phase stable signals.

Figure 1:
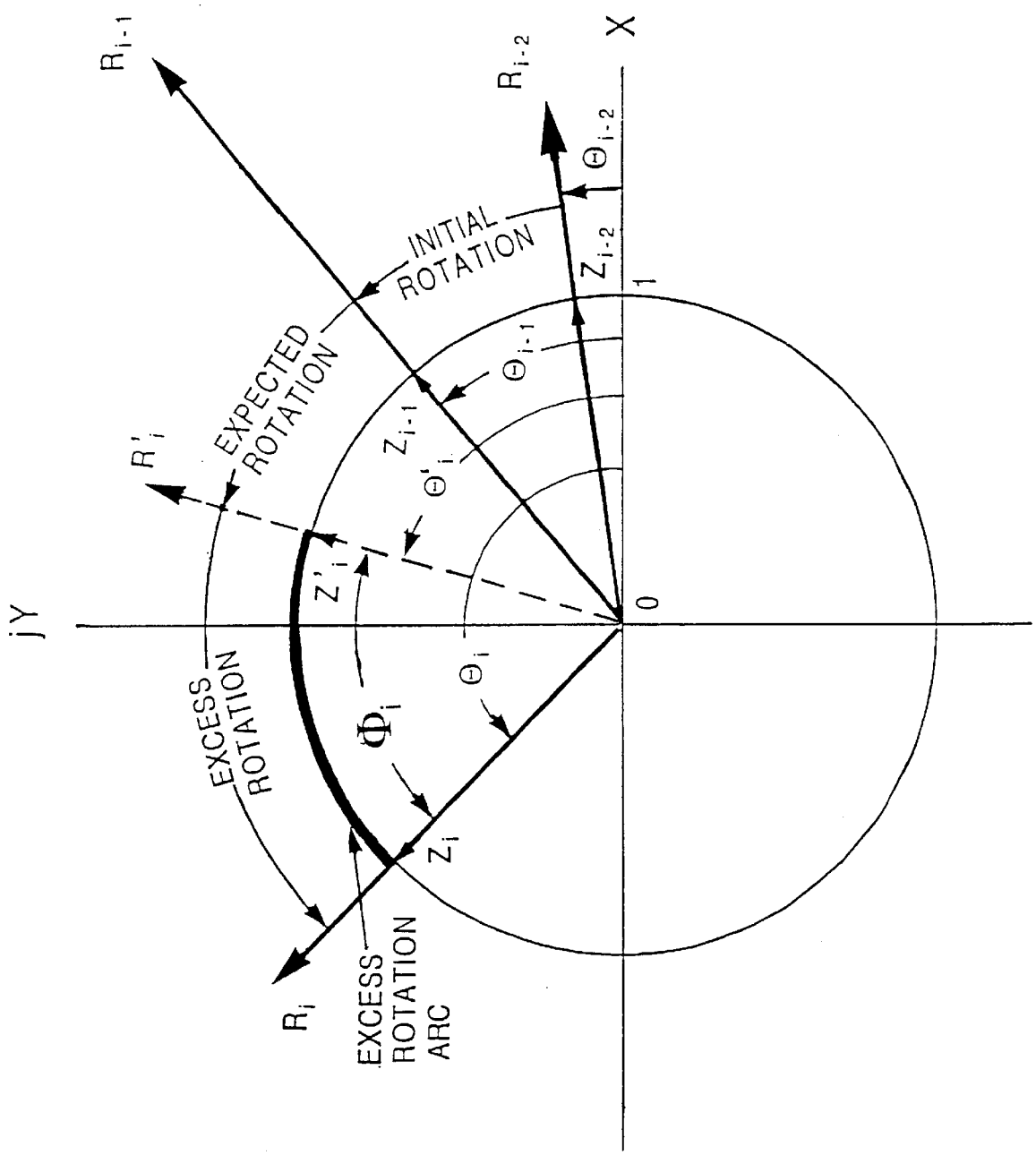
FIG. 1 is a polar coordinate diagram illustrating the phase relationship between consecutive samples of a complex vector quantity $R_{i-2}$, $R_{i-1}$, and $R_i$.
Figure 2:
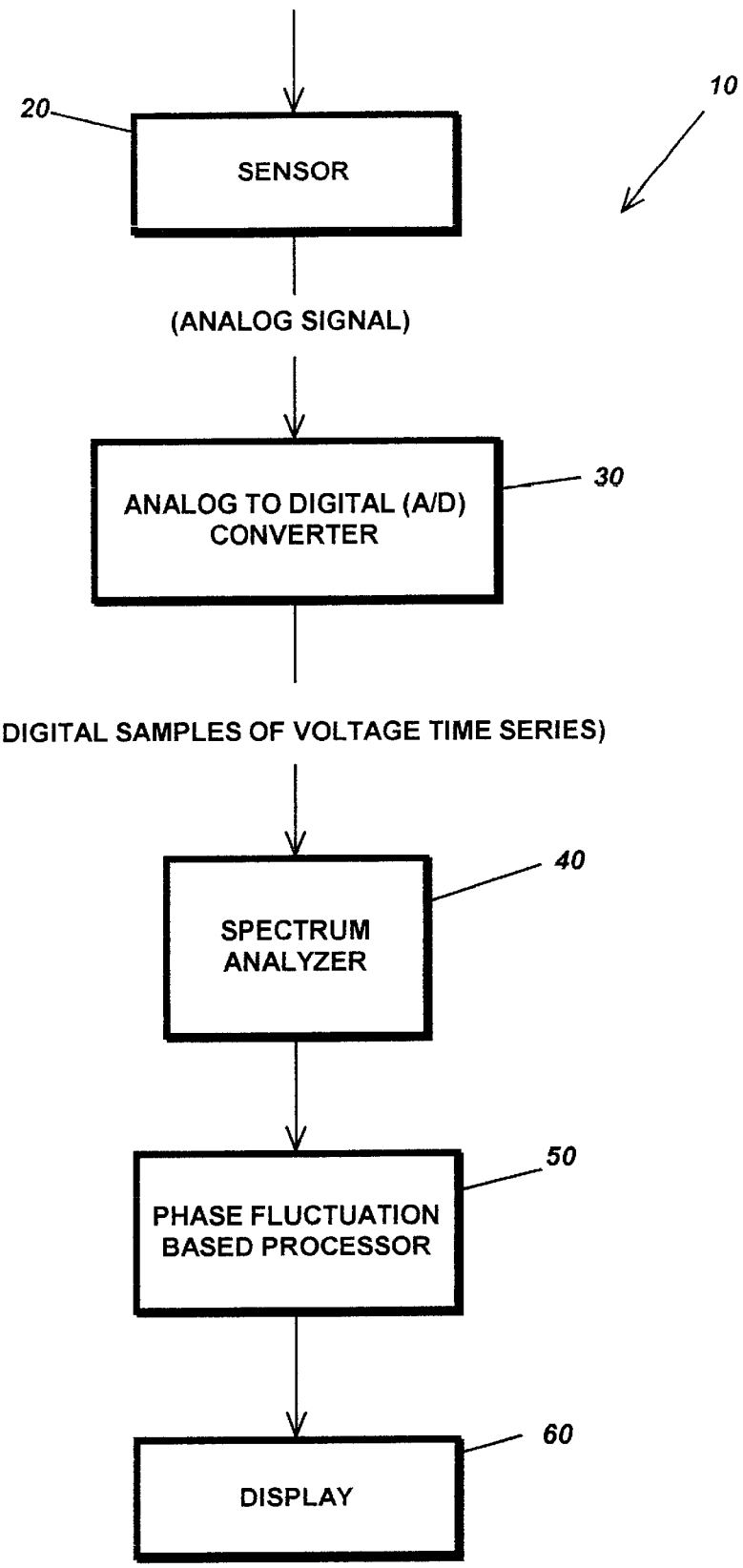
FIG. 2 is a flow chart of a phase fluctuation based processing system according to the invention.

Referring first to FIG. 2, system 10 is an arrangement of hardware suitable to practice the invention. A time series of data which represents physical characteristics is received at a sensor, 20. The physical characteristics these data represent may be of many types, for example, sonar receiver data. The time series of data is sampled and digitized by an analog-to-digital converter, 30, and transformed into the frequency domain by a spectrum analyzer, 40, which could employ a conventional fast Fourier Transform technique.

The output of the spectrum analyzer is in the form of a time series of complex vectors $R_i$, for i=1 to N, each vector having an amplitude $r_i$ and and a phase $\theta_i$. Each complex vector quantity is assigned to a discrete frequency bin (i.e. within the frequency increment spanned by the bin).

A phase fluctuation based processor, 50, described in later paragraphs herein, is used to process the output of the spectrum analyzer, in a manner which filters the noise from the signal received at the sensor, 20. A display unit, 60, is used to show the results of the phase fluctuation based processor, 50.

Figure 3:
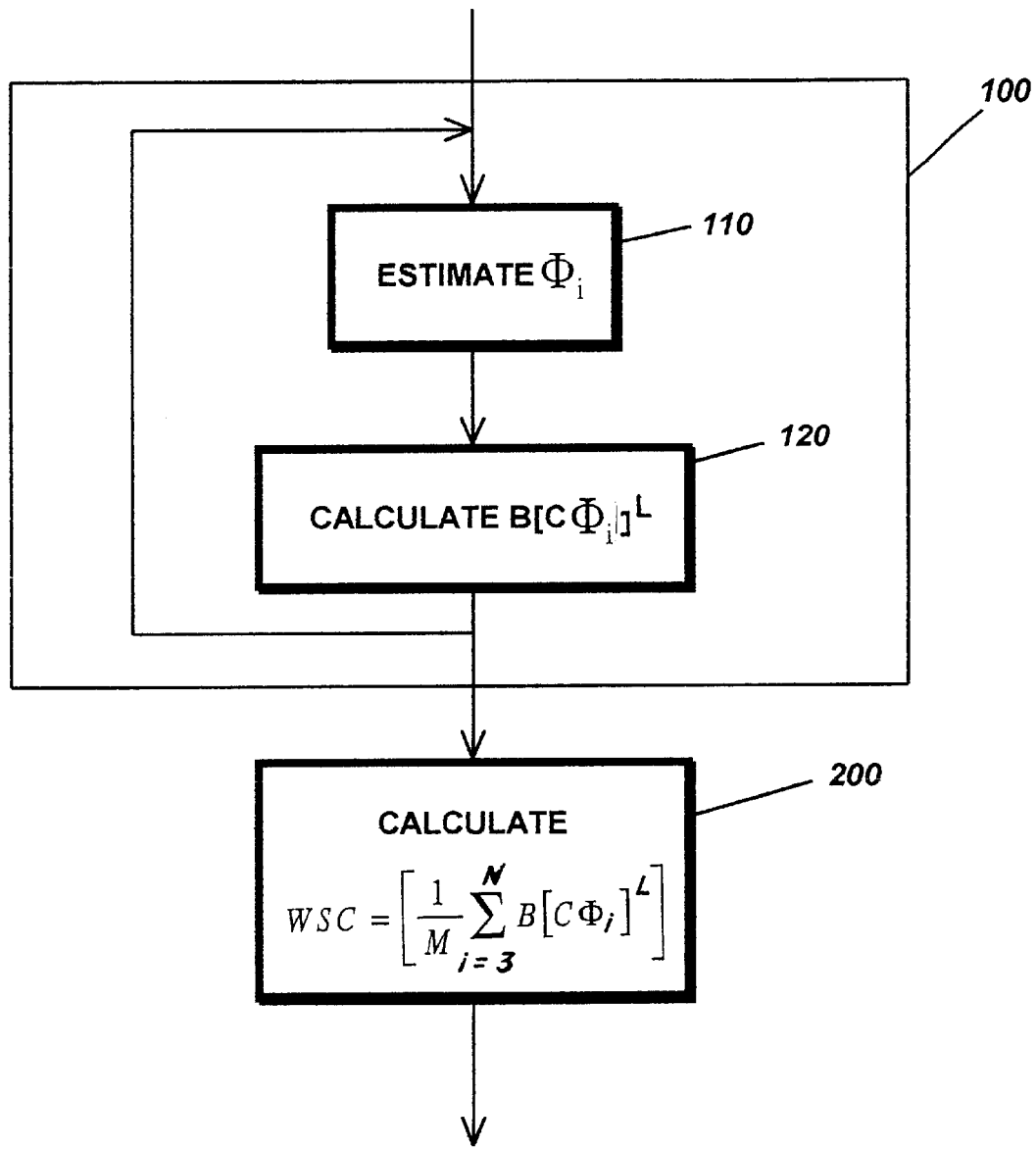
FIG. 3 is a flow chart of a WSC phase fluctuation based processor according to the invention.

FIG. 3 illustrates one embodiment of a phase fluctuation based processor according to the invention which relies on the excess phase rotation angle to identify small phase fluctuations.

If WSC is defined as $$WSC = \left[\frac{1}{M}\sum_{i=3}^{N}B[C\Phi_i]^L\right] \quad \text{Equation (3)}$$

where $\Phi_i$=the absolute value of the ith excess phase rotation angle and may be estimated by using Equation (2) or by another method;

L is a non-zero positive real number,

C is a non-zero real number, preferably a selectable normalization constant,

B is a positive real number, and

M is a normalization factor.

Referring to FIG. 3, at each sampled data point from i=3 to N, an estimate of $\Phi_i$ is made. 110. The estimate may be made using Equation (3) or by another method. At 120, a calculation of $B[C\,\Phi_i]^L$ is made for each data point i. Next, at 200, WSC is calculated by summing the $B[C\,\Phi_i]^L$ terms over i=3 to N and dividing the sum by the normalization factor M. The WSC calculation is performed for each frequency bin and spatial increment (here hydrophone beam number). A digital computer is typically used for estimating $\Phi_i$ and for calculating WSC and other parameters.

As the processor parameter B in Equation (3) is increased or decreased, the WSC value increases or decreases proportionally. By adjusting B, the degree of attenuation of clutter signals or noise may be increased or decreased. Similarly, increasing the exponent L enhances the response of the WSC processor to high phase fluctuations. The normalization constant C permits adjustment of the dividing line between noise phase above and signal phase below. The normalization factor M is preferably set to N−2, the number of samples in the summation, as it is a convenient quantity with which to normalize the summation term. Other non-zero real values of M may also be used.

Figure 4A:
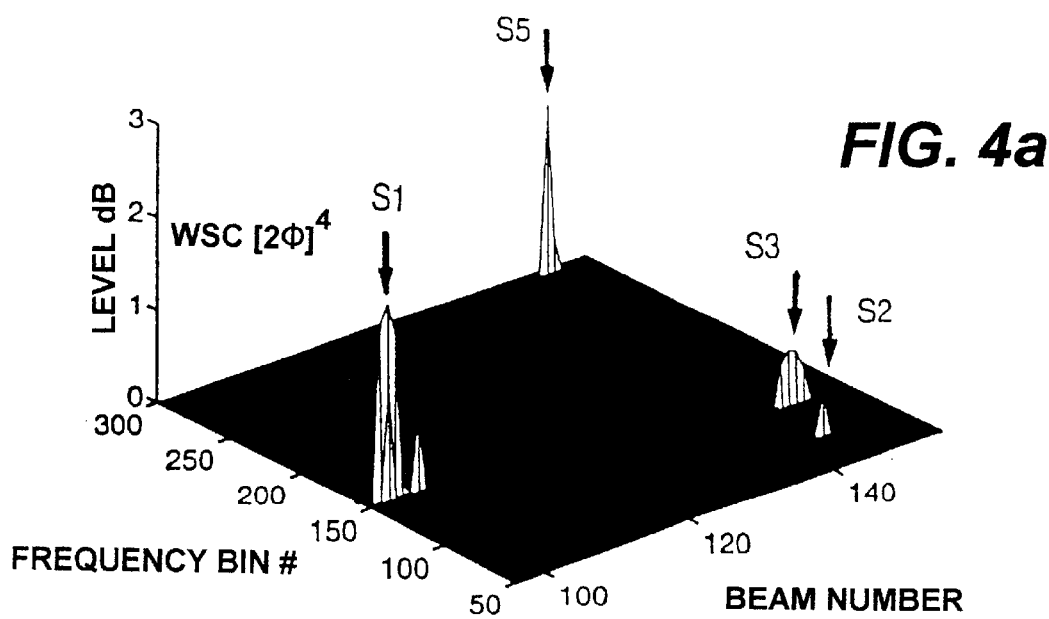
FIGS. 4a and 4b show power level resulting from application of two WSC phase fluctuation based processors to underwater sonar receiver data, plotted versus frequency bin number and beam number for frequency bins 50 to 300 and beam numbers 95 to 155.
Figure 4B:
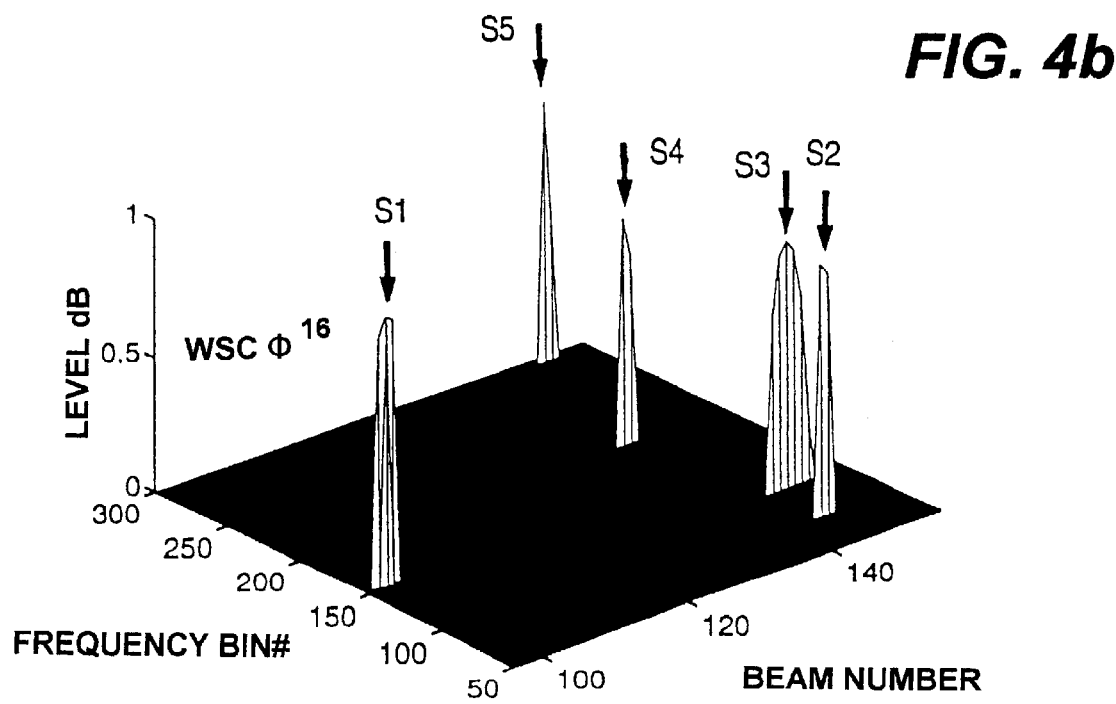

The advantages of the phase fluctuation processor of Equation (3) may be seen by inspection of FIGS. 4a and 4b. FIGS. 4a and 4b illustrate the result of applying two Equation (3) WSC phase fluctuation based processors to a stream of underwater acoustic data received by a sonar hydrophone. The sonar data include both low phase fluctuation signals and noise, which is characterized by high phase fluctuations. The result of applying an Equation (3) WSC processor to underwater acoustic data is plotted as power level versus the frequency bin number and against the receiver beam number. Two different sets of filter parameters are illustrated: FIG. 4a illustrates an Equation (3) based WSC phase fluctuation based processor with B=1, C=2, and L=4; FIG. 4b illustrates an Equation (3) based WSC phase fluctuation based processor with B=1, C=1, and L=16. Notice that the plots have been inverted, so that the smaller values of WSC will be visible above the horizontal plane on the three dimensional plot.

A note on terminology is provided for clarity. In FIGS. 4a and 4b, as well as in later Figures, the values for parameters B, C, and L are identified as follows: For B=1, C=2, and L=4, WSC is noted as WSC $[2\Phi^4]$. For B=1, C=1, and L=16, the WSC result is noted as WSC $[\Phi]^{16}$, or more simply, by WSC $\Phi^{16}$.

Figure 5:
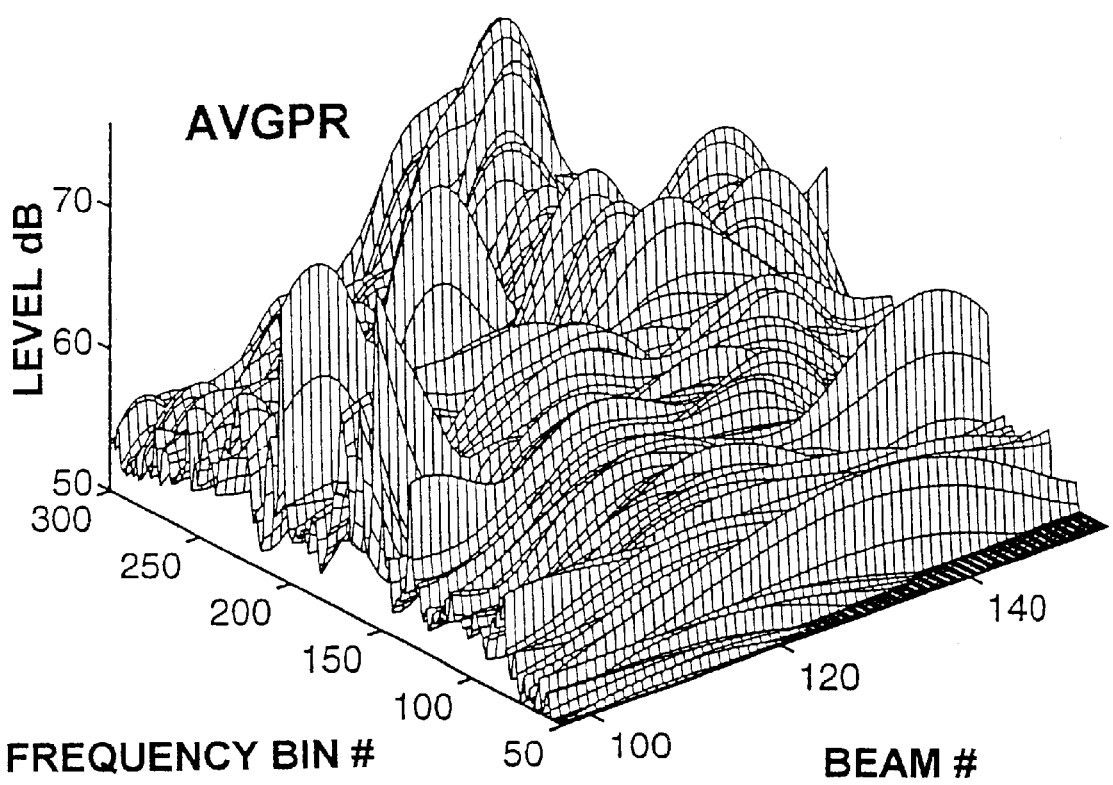
FIG. 5 shows power level resulting from application of an AVGPR processor value versus frequency bin number and beam number for frequency bins 50 to 300 and beam numbers 95 to 155.

In order to further demonstrate the advantages of WSC phase fluctuation based processors over traditional signal processors, refer to FIG. 5, which illustrates the result of an amplitude based signal processor, AVGPR, applied to the same set of underwater sonar hydrophone data. Briefly, the AVGPR processor is based on the incoherent average (an average taken without phase aligning the vectors) of the magnitudes of a set of data vectors $\{R_i\}$. This is a common technique used in spectral analysis of data. For a set of data i=3 to N (for consistency with the summations in WSC and other processors), AVGPR is defined using a power-law processor equation as $$AVGPR = \frac{1}{N-2}\sum_{i=3}^{N}r_i^K \quad \text{Equation (5)}$$

where $r_i$=the magnitude of the vector $R_i$, N=the total number of samples, and K=2. (This is a specific case of the general form of the power law equation which allows K to be any real number. According to A. H. Nuttall, "Performance of Power-Law Processor with Normalization for Random Signals of Unknown Structure," NUWC-NPT Technical Report 10,760, May 1997, the power law processor with a value of K of 2.4 is considered to be the optimum processor for a sinusoidal signal in Gaussian white noise. Since these optimal conditions do not occur often in real measurement situations, values of K may be selected which are appropriate for the processor and environmental conditions.) Alternatively, a real number other than N−2 may be used in Equation (5) above to normalize the summation term. Although N−2, which is the number of samples, is a convenient quantity with which to normalize the summation term, many other values may be used if desired.

The advantages of using the phase fluctuation based processors are apparent by comparing the AVGPR and WSC curves. Because the AVGPR curve of FIG. 5 has many large values of AVGPR which might indicate a signal, it is difficult to distinguish signal from noise, while in contrast, the WSC curves of FIGS. 4a and 4b have only a few points where the low frequency fluctuation may indicate a submerged source. Most noise has been filtered by the WSC processor. Again, the plots have been inverted for clarity, so that the WSC results will be visible above the horizontal plane.

In another embodiment of the invention, an automatic signal detector is based on a WSC phase fluctuation based processor to filter all high phase fluctuation signals and automatically identify only those signals having a sufficiently low phase fluctuation. Since a small value of WSC from Equation (3) indicates that the received signal has a low phase fluctuation amplitude, a threshold value may be set for WSC, so that when the calculated value for WSC in a frequency bin is less than or equal to the preset WSC threshold value, detection of a signal with low fluctuation amplitude is indicated. The automatic signal detector may be set to provide an audible alarm or visual indication when low phase fluctuation signals are found.

The WSC threshold value for an automatic signal detector will depend on the type of data, the characteristics of the processor such as frequency bin width, percent of time domain overlap, size of the average, and the processor parameters (the values of B, C, and L in Equation (3)).

An optional feature of an automatic signal detector is the ability for the operator to increase or decrease the WSC threshold value. This modifies the sensitivity of the phase fluctuation based WSC signal detector, such that as the WSC threshold value is decreased, fewer false alarms will occur. As the WSC threshold value is decreased, however, the signal processor may miss some low phase fluctuation signals. The operator's adjustment of the WSC threshold will, therefore, depend on the operator's tolerance for false alarms and missed signals.

In one example, for a WSC phase fluctuation based processor used in underwater acoustic signal detection having values of B=1, C=2, and L=4, a WSC threshold value was set as 10 (10 dB). So, if the WSC phase fluctuation processor calculated WSC as less than 10 (10 dB), detection of a signal from a submerged acoustic source is indicated. Note that later Figures will illustrate the application of thresholds to WSC and other phase fluctuation processors.

In another embodiment, a phase fluctuation based processor is used to enhance the performance of another signal processor, allowing a WSC phase fluctuation based processor to improve the signal to noise ratio of existing signal processor with minimal system redesign. A phase fluctuation based processor may be added to many other types of signal processors, including those based on phase fluctuations, amplitude, or other signal processing techniques.

Figure 6:
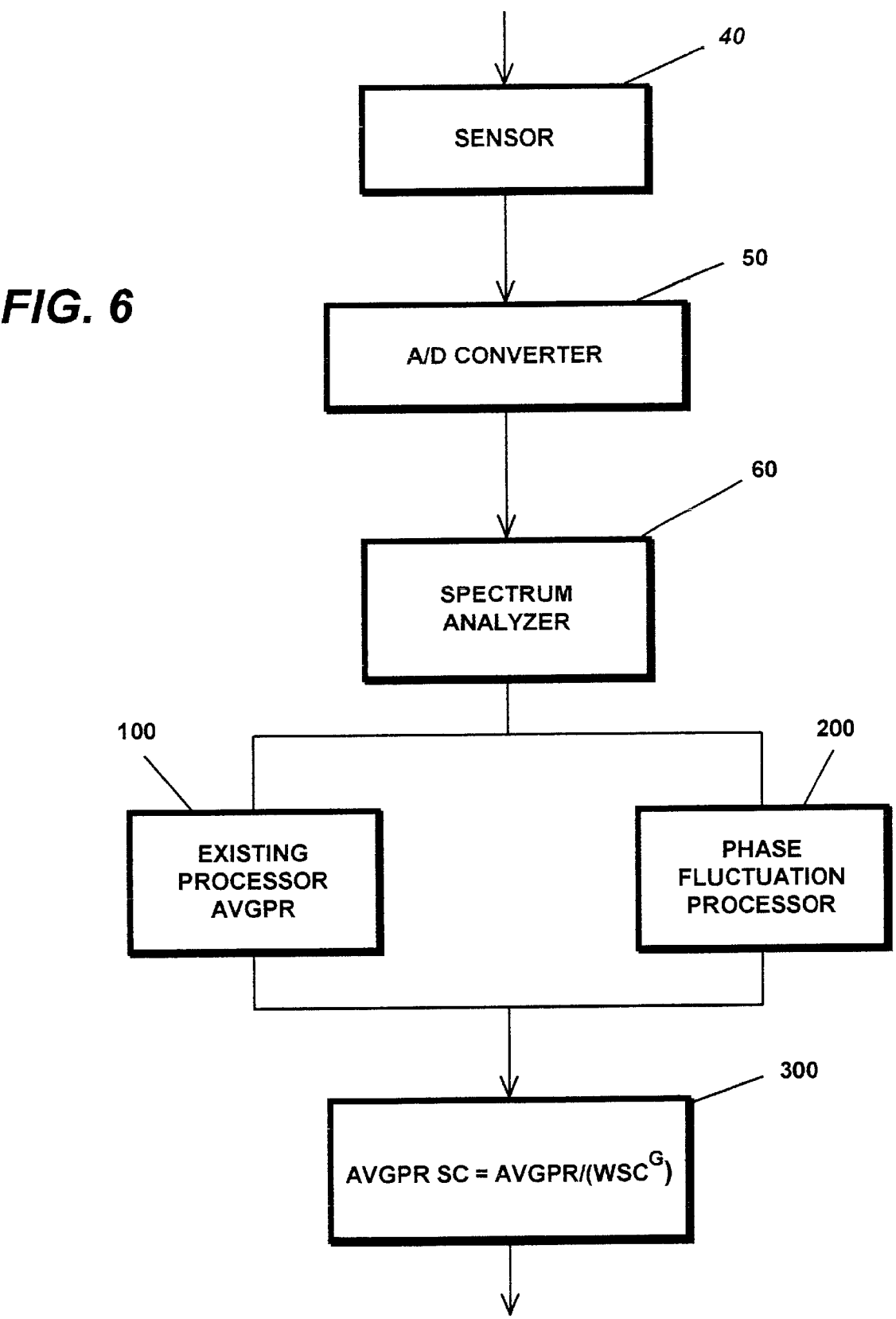
FIG. 6 is a flow chart which illustrates the addition of a WSC phase fluctuation based signal processor to an existing signal processor.

One method for enhancing an existing processor is to divide the output of the existing processor by the output of the WSC phase fluctuation based processor. The result will be a modified output that is preferentially attenuated, with the frequency bins with least phase stability being attenuated the most. As an example, FIG. 6 illustrates the addition of a WSC processor to an AVGPR processor. Data are received at a sensor, 40, digitally sampled in an analog to digital converter, 50, and initially processed in a spectrum analyzer, 60. This initially processed data points are input into an existing signal processor 100 (here the AVGPR processor of Equation (5) with K=2, although other processors may be used). The same initially processed data points from the spectrum analyzer, 60, are also input into a phase fluctuation based signal processor, 200, where WSC is calculated. In 300, the AVGPR result from 100 is divided by WSC from 200, raised to an exponent G, according to $$AVGPR\ SC = AVGPR/(WSC^G) \qquad \text{Equation (6)}$$

The AVGPR SC processor shown in FIG. 6 attenuates the frequency bins which contain non-phase stable data more than frequency bins with data which are phase stable. It can be seen by inspection that if G is a positive real number, then as G increases, enhanced performance is achieved (low phase fluctuation signals are attenuated and strong phase fluctuation signals are emphasized). A special case is G=1, where the output of the signal processor is divided by the WSC value.

In other embodiments, WSC phase fluctuation based processors can also be used to enhance signal processors other than an AVGPR processor. An example is the WISPR SC processor, in which WSC can enhance the amplitude fluctuation based processor WISPR processor described herein.

In a WISPR processor the amount of fluctuation in the amplitude of a signal is determined, and signals with large amplitude fluctuation are distinguished from signals with small amplitude fluctuation. Several WISPR processors are discussed in Wagstaff et al, The AWSUM Filter: A 20 dB Gain Fluctuation-Based Processor, IEEE Journal of Oceanic Engineering, Vol 22, No. Jan. 1, 1997, pages 110–118, incorporated herein in its entirety.

For this example, WISPR is defined using a special form of the Power-Law processor equation, as $$WISPR = \left[\frac{1}{M}\sum_{i=3}^{N} r_i^{-2}\right]^{-1}. \qquad \text{Equation (7)}$$

where $r_i$ is the amplitude of the complex data vector $R_i$, for i=1 to N, and N is the number of samples.

The M term in Equation (7) is used to normalize the $r_i^{-2}$ summation, and is preferably equal to the number of samples, N−2. Although N−2 is a convenient quantity with which to normalize the summation term, many other values of M may be used.

Because the exponents in Equation (7) are negative, the WISPR value is dominated by small values of $r_i$, while large values of $r_i$ are attenuated. The dominant small values of $r_i$ are generally caused by propagation medium induced fluctuations. Large values of $r_i$ are associated with low amplitude fluctuation signals. Therefore, the WISPR calculation of Equation (7) will be dominated by terms which result from propagation medium induced fluctuations, rather than by terms which result from low fluctuation amplitude signals.

It is useful to compare the WISPR summation of Equation (7) with the AVGPR summation of Equation (3). In contrast to the WISPR summation, the AVGPR summation in Equation (3) has a positive exponent value. Therefore, the AVGPR result is dominated by large values of $r_i$. Small values of $r_i$, which result from propagation medium induced fluctations (noise) have very little influence on AVGPR, but tend to dominate the WISPR result of Equation (7).

A WISPR amplitude based processor can be enhanced by dividing the amplitude fluctuation based WISPR processor output by the phase fluctuation based WSC processor output raised to an exponent G as follows:

$$WISPR\ SC = WISPR/(WSC)^G \qquad \text{Equation (8)}$$

In another embodiment, the amplitude AVGPR processor may be enhanced by application of an amplitude fluctuation based processor WISPR. If DELTA is defined as $$DELTA = AVGPR/WISPR \qquad \text{Equation (9)}$$

then DELTA provides a direct measure of fluctuation content and a processor based on DELTA can be used to identify low amplitude fluctuation signals. In underwater acoustics, these signals often identify submerged acoustic sources of interest, so a low value of DELTA is associated with a low amplitude fluctuation signal.

A threshold value for DELTA can be defined to indicate the presence of a low amplitude fluctuation signal. For underwater sonar data, empirical evidence has shown that a threshold value of 1.4 for DELTA is effective, so that if $$DELTA \leq 1.4 (1.5\ dB) \qquad \text{Equation (10)}$$

a low amplitude fluctuation (LOFA) signal of interest is indicated. This processor can also be used to provide automatic signal detection, wherein an indicator will provide the operator with an indication that a signal of interest (having a DELTA value less than the threshold) has been received.

Test Results for Phase Fluctuation and Amplitude Fluctuation Processors Applied to Underwater Sonar Data FIG. 7 shows an example of a WSC process for identifying low phase fluctuation acoustic signals in an underwater environment. Time domain data are received from a hydrophone 10, which has converted the measured pressure to analog signal voltage. An Analog to Digital converter 20 converts the input analog signal voltage to digital samples of the voltage time series. A spectrum analyzer 30 analyzes the digital voltage time series and produces phase angles ($\theta_i$) in frequency bins, $f_i$. In step 40, the values of excess phase rotation $\Phi_i$ and the values of $B[C\Phi_i]^L$ are calculated. In step 50, successive values of $B[C\Phi_i]^L$ are averaged to determine WSC for each frequency bin $f_i$.

In this example, the values of B, C, L, and G are selected to be B=1, C=2, L=4, and G=1. The equations for WSC, AVGPR, and WISPR SC reduce to $$WSC\ [2\Phi]^4 = \left[\frac{1}{M}\sum_{i=3}^{N}[2\Phi_i]^4\right] \quad \text{Equation (11)}$$

$$AVGPR\ SC\ [2\Phi]^4 = AVGPR/WSC\ [2\Phi]^4 \quad \text{Equation (12)}$$

and $$WISPR\ SC\ [2\Phi]^4 = WISPR/WSC\ [2\Phi]^4 \quad \text{Equation (13)}$$

Note that the designation $[2\Phi]^4$ is added to the AVGPR SC and WISPR SC in Equations (12) and (13) above to indicate that B=1, C=2, L=4, and G=1.

Figure 8A:
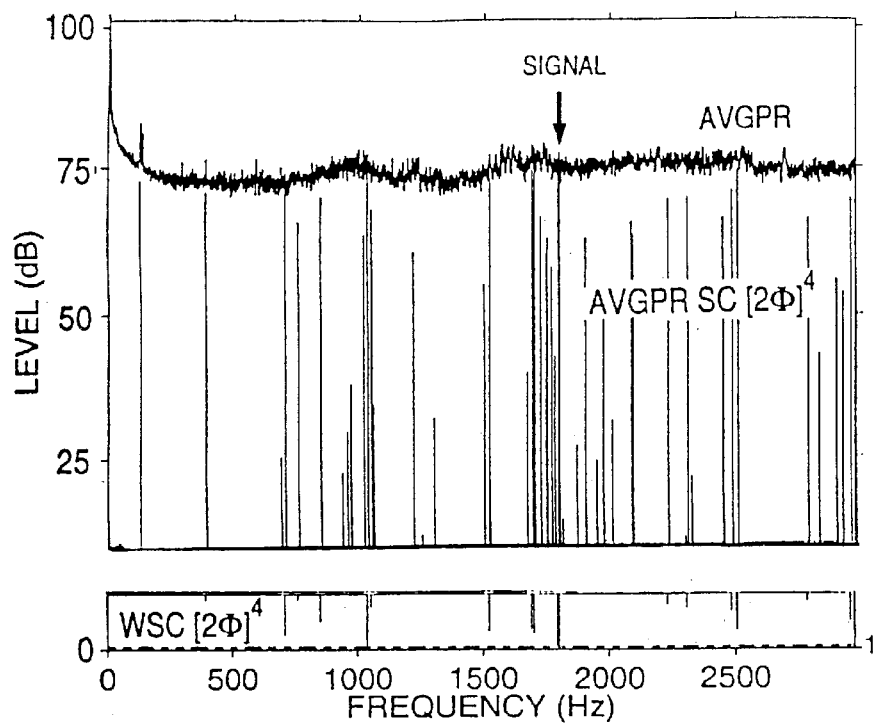
FIGS. 8a and 8b are plots of AVGPR, AVGPR SC $[2\Phi]^4$, and WSC $[2\Phi]^4$ versus frequency for underwater sonar receiver data.
Figure 8B:
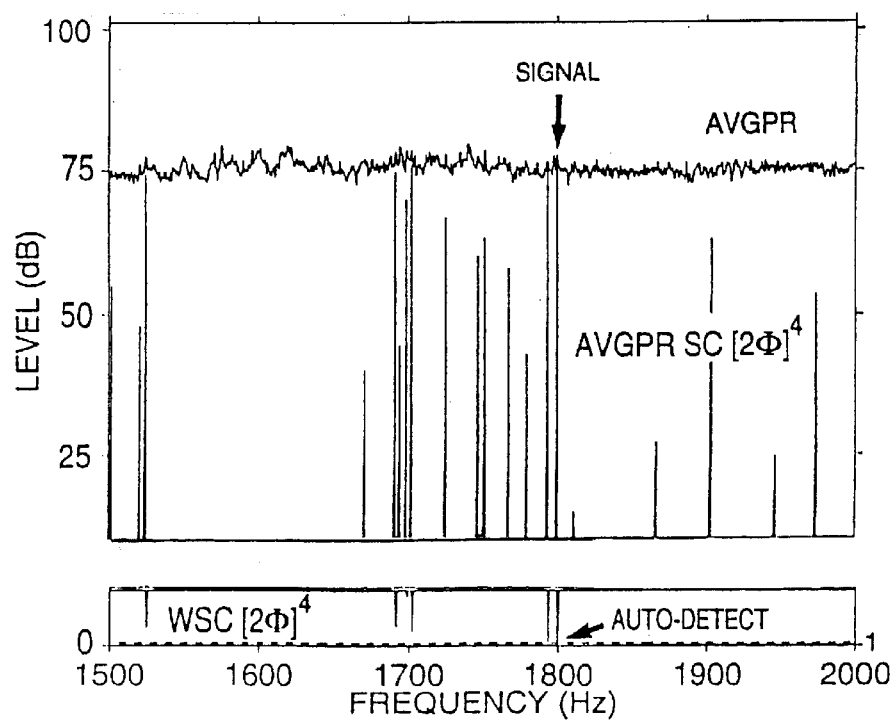

If a processor based on Equations (11), (12), and (13) is applied to the same data used FIGS. 4a–4c, the advantages of applying WSC are apparent. Refer to FIG. 8a, which shows the AVGPR, the AVGPR SC $[2\Phi]^4$, and the WSC $[2\Phi]^4$ for frequencies between 0 and 3000 Hz. The top curve is AVGPR, in which it is very difficult to distinguish signal from noise. The middle curve is AVGPR SC$[2\Phi]^4$. The many spectral lines in the AVGPR SC $[2\Phi]^4$ curve reflect the attenuation of the AVGPR curve based on the phase fluctuation measurement WSC $[2\Phi]^4$, and indicate the possible presence of relatively high amplitude, low phase fluctuations signals. The bottom curve is WSC $[2\Phi]^4$, and shows only those signals with a WSC $[2\Phi]^4$ value of less than 10 dB, as this is the region of interest, as an automatic signal detector with a 10 dB threshold would do. Signals with less phase fluctuation will have a WSC $[2\Phi]^4$ value very close to zero dB, so a user may set a threshold at a level below which a sufficiently small phase fluctuation signal is indicated. The threshold level selected will vary with the type of data and the processor characteristics (the values of B, C, L, and G). For undersea acoustic data and a WSC $[2\Phi]^4$ processor, a threshold of 1 dB provides good results. As seen in the bottom curve of FIG. 8a, only one signal (at approximately 1800 Hz) has a WSC $[2\Phi]^4$ value less than 1 dB. Closer examination of FIG. 8b, which expands FIG. 8a for the frequency range 1500–2000 Hz, shows that the WSC $[2\Phi]^4$ line at approximately 1800 Hz in FIG. 8a is resolved into two WSC $[2\Phi]^4$ lines at 1792 Hz and at 1800 Hz. Only the signal at 1800 Hz has a WSC $[2\Phi]^4$ value less than 1 dB, indicating that the response at 1792 Hz is probably clutter, and that the response at 1800 Hz is probably a submerged acoustic source at 1800 Hz.

Figure 9A:
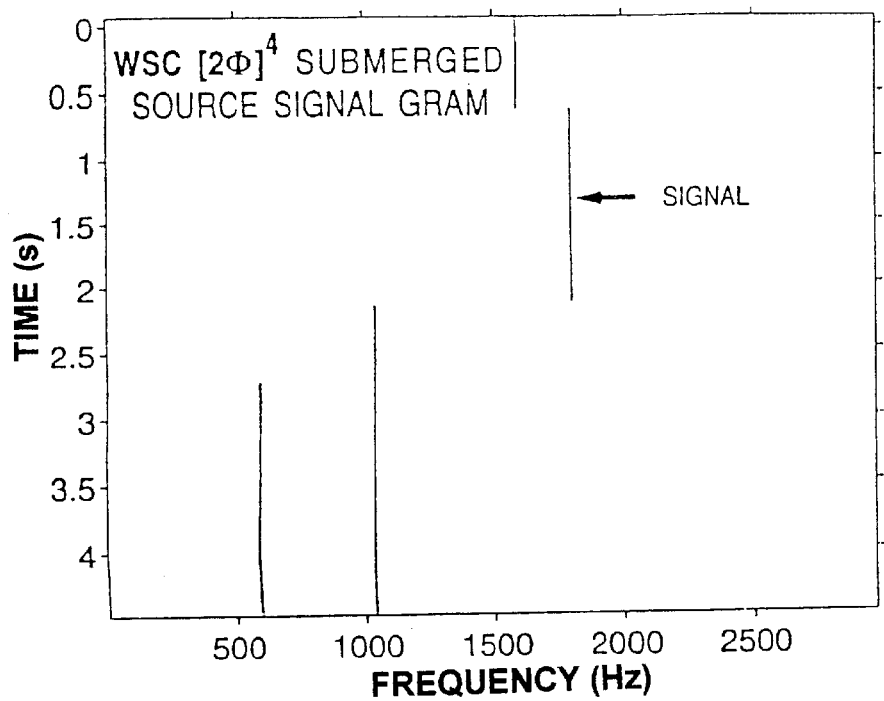
FIGS. 9a and 9b are submerged source signal grams corresponding to FIGS. 8a and 8b.
Figure 9B:
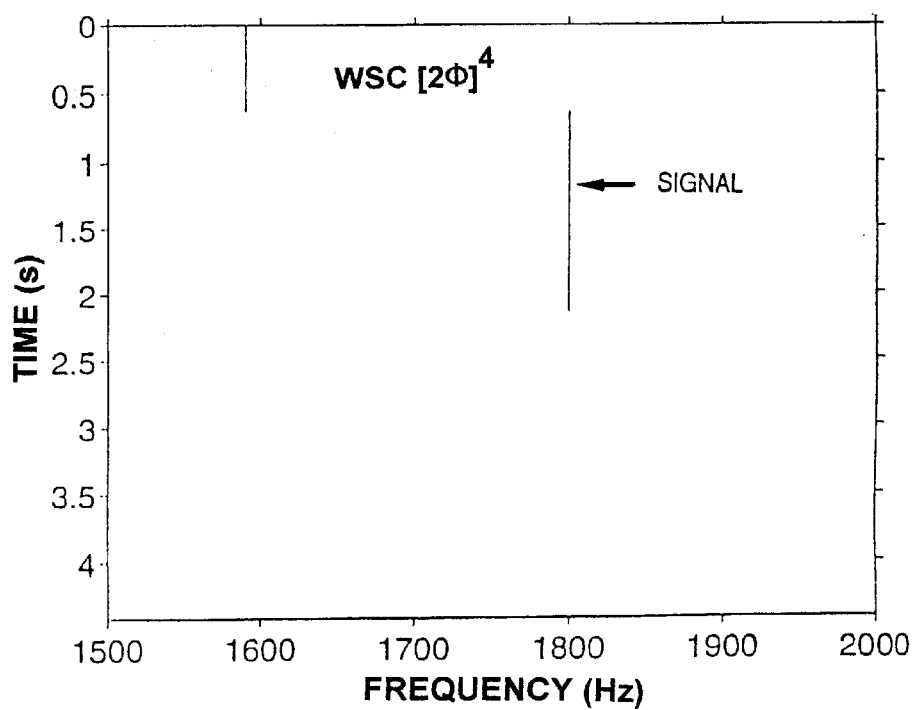

A plot showing only the signals with a WSC $[2\Phi]^4$ value less than the 1 dB threshold can be made by indicating the presence of the signal on a plot of elapsed time versus frequency. FIGS. 9a and 9b present the data in this format, herein called a submerged signal gram, and correspond to the data in FIGS. 8a and 8b, respectively. The low fluctuation signal at 1800 Hz is apparent in both FIG. 9a and 9b during the period of 0.6 to 2 seconds. Note that the submerged signal grams also show the presence of several other signals of interest, at 600 Hz, 1050 Hz, and 1600 Hz. These signals do not appear in FIGS. 8a and 8b because FIGS. 8a and 8b correspond to the time period 1 to 1.5 seconds only. These signals at 600 Hz, 1050 Hz, and 1600 Hz do not correspond to any known submerged acoustic sources in the test range area during that period, so they are considered false alarms, possibly due to nearby shipping.

Figure 10A:
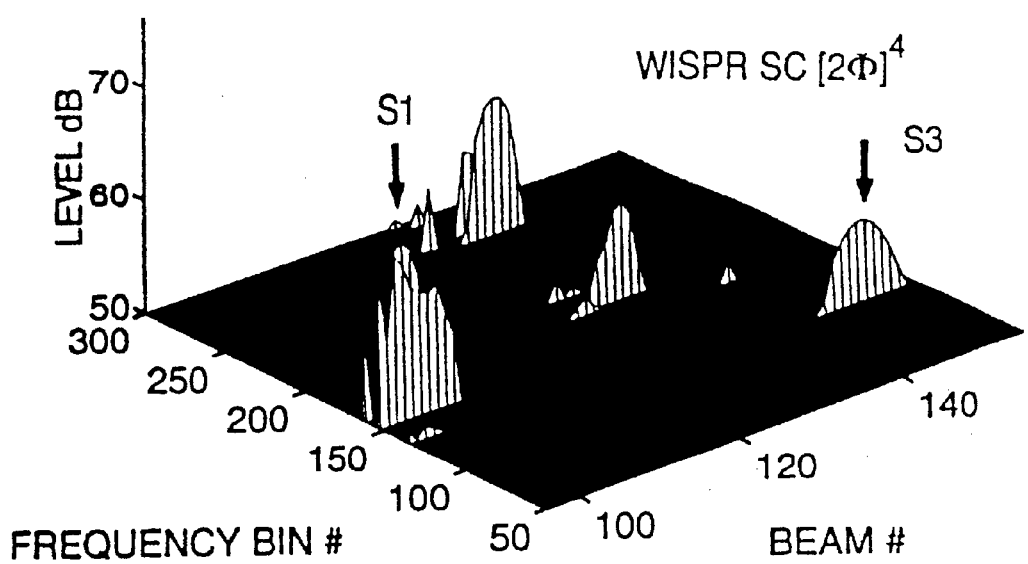
FIGS. 10a and 10b are plots of WISPR SC versus frequency bin number and beam number.
Figure 10B:
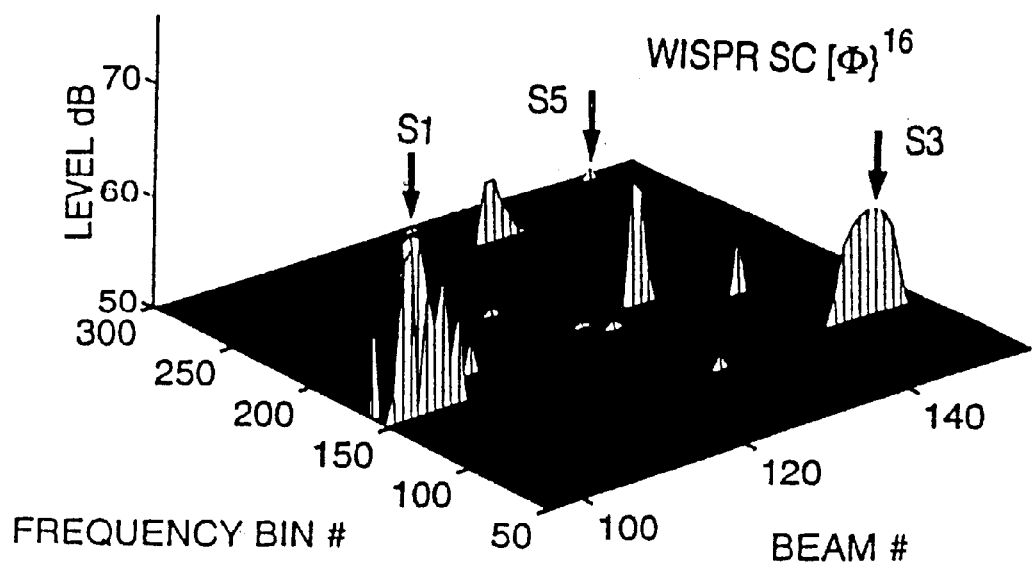

FIGS. 10a and 10b show three dimensional plots resulting from the application of WISPR SC processors (WISPR SC $[2\Phi]^4$ and WISPR SC $\Phi^{16}$) to the test data for which AVGPR is plotted in FIG. 5. These data were collected, as discussed above, during an acoustic measurement exercise conducted in the northeast Pacific Ocean. In order to arrive at the FIGS. 10a and 10b plots, the WISPR SC results of Equation (8) were calculated for each frequency bin number and hydrophone beam number bin, and WISPR SC $[2\Phi]^4$ and WISPR SC $\Phi^{16}$ were plotted versus frequency bin number and beam number. By comparing these plots to the AVGPR curve of FIG. 5, it is clear that the WISPR SC processors much more effectively identify signals of interest than does an AVGPR processor.

FIG. 10a presents the results of applying a WISPR SC $[2\Phi]^4$ processor with B=1, C=2, L=4, and G=1 to these data. FIG. 10b presents the results of applying a WISPR processor designated WISPR SC $\Phi^{16}$ (indicating that B=1, C=1, L=16, and G=1) to the same test data These results may be compared to the results of applying a WSC $[2\Phi]^4$ processor to the same test data, which are shown in FIGS. 4a and 4b.

Referring to FIG. 10a and 10b, by inspection of the WISPR processor results alone, it is not possible to determine how much the noise and clutter have been attenuated, and how much the Signal to Noise ratio (SNR) of the signals which have small phase fluctuations have been increased. Because the WISPR SC processors consider the amplitude as well as the phase fluctuation (based on excess phase rotation $\Phi_i$), the processors WISPR SC $[2\Phi]^4$ and WISPR SC $\Phi^{16}$ illustrated in FIGS. 10a and 10b do not distinguish between noise, clutter signals, and low phase fluctuation signals of interest as effectively as do the phase fluctuation based WSC processors which do not consider amplitude. Clutter signals are further attenuated through the WSC process of Equation (3), so only signals with small phase fluctuations survive to be plotted as WSC in FIGS. 4a and 4b, while other clutter signals and noise are apparent in the WISPR SC curves of FIGS. 10a and 10b. Although the WISPR SC processors are not as effective at attenuating noise and clutter signals as WSC phase fluctuation based processors, they are far superior to typical processors such as AVGPR, which do not consider phase or amplitude fluctuations, so the WISPR SC processors can be extremely useful in increasing the SNR of existing processors.

Figure 11A:
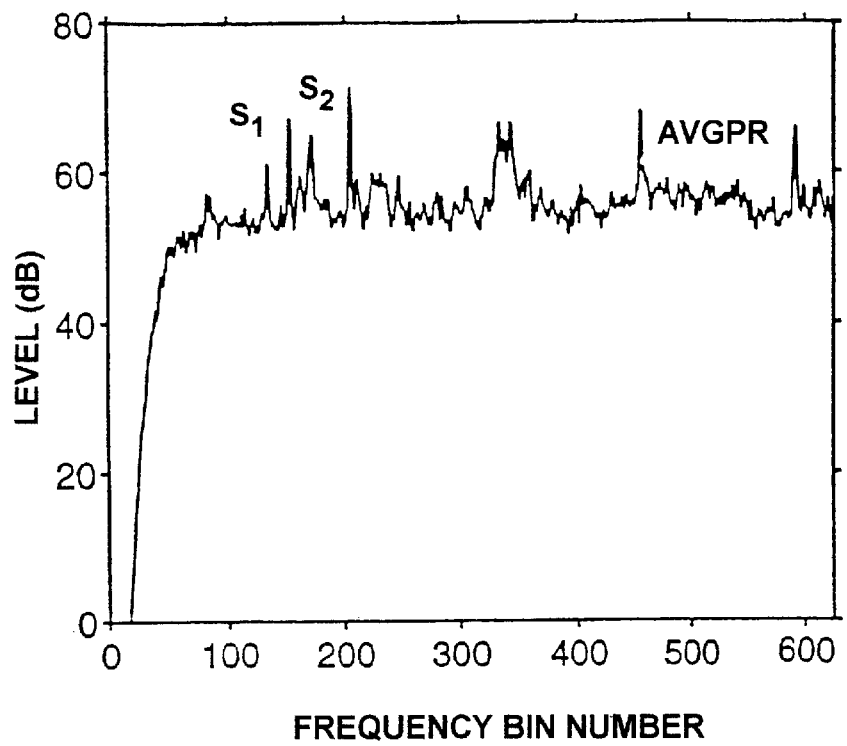
FIGS. 11a and 11b are plots of AVGPR, WISPR, and DELTA versus frequency bin number.
Figure 11B:
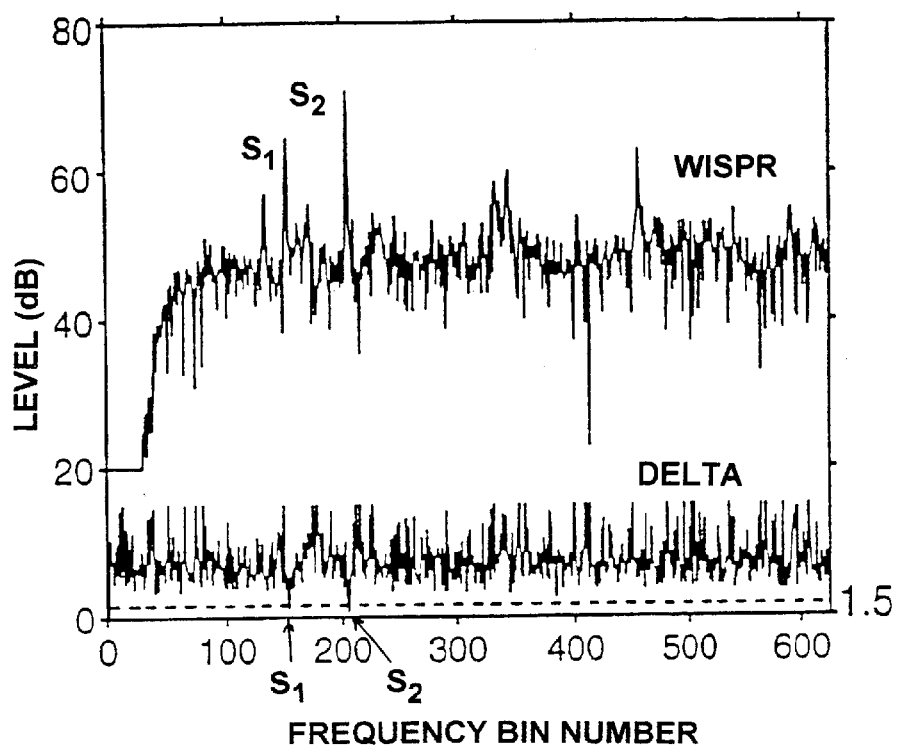
Figure 11C:
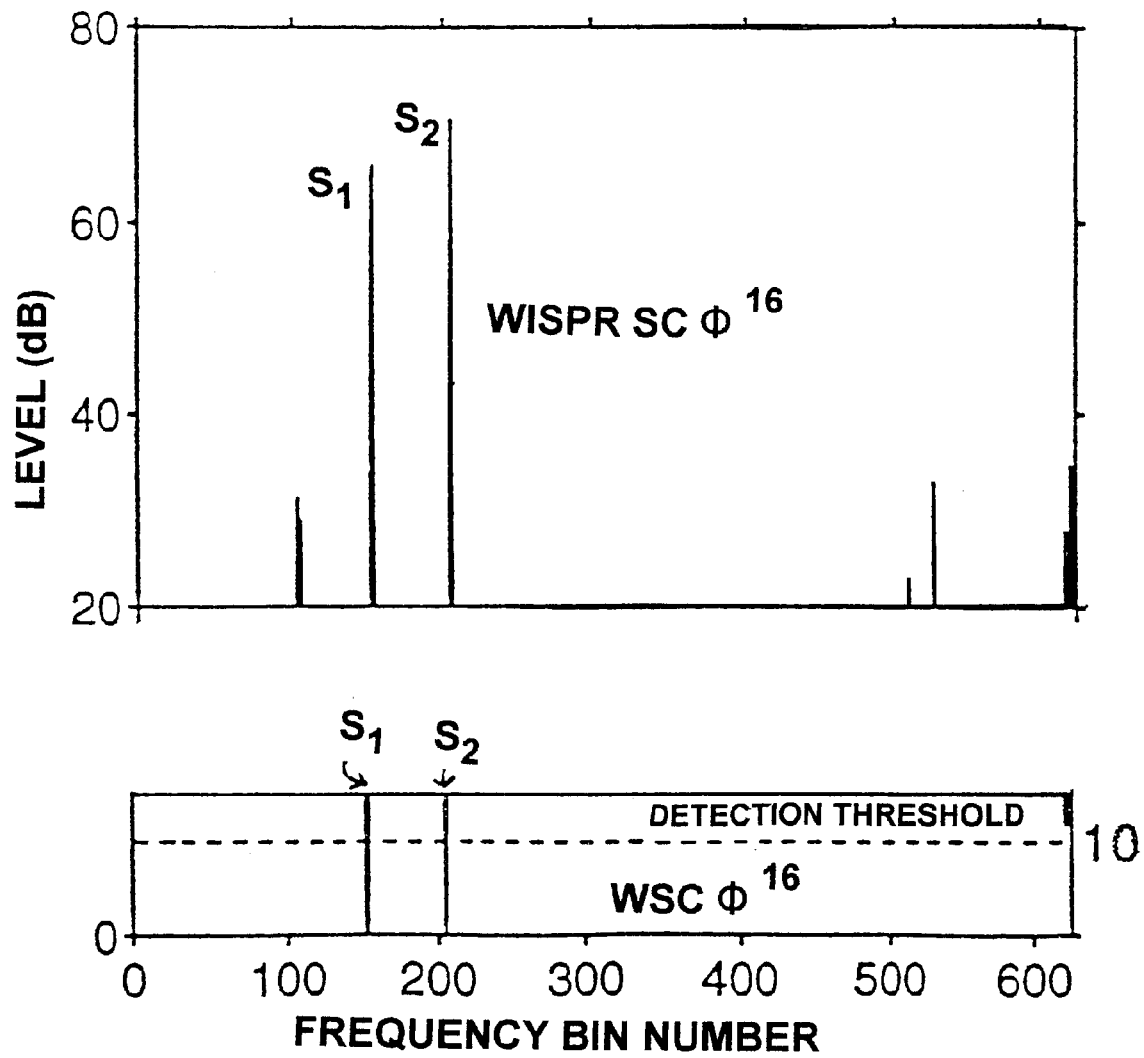
FIG. 11c is a plot of WISPR SC $\Phi^{16}$ and WSC $\Phi^{16}$ corresponding to FIGS. 11a and 11b.

Additional understanding of the differences between phase fluctuation processors and amplitude fluctuation processors can be achieved by directly comparing results of applying these processors to the same test data. FIGS. 11a, 11b, and 11c present the results of applying the AVGPR, WISPR, DELTA, WISPR SC $[2\Phi]^4$, and WSC $[2\Phi]^4$ to the same test data. These curves plot processor power level versus frequency for a particular beam slice of the 3-D plots of FIGS. 5, 4a, 4b, 10a, and 10b. Referring first to FIG. 11a, the result of an AVGPR processor is plotted. Two known low amplitude fluctuation signals from a submerged source are designated by S1 and S2. Others signals, believed to be from surface ships, as well as some noise, also appear in the AVGPR spectrum. It is very difficult to determine which spikes are from submerged acoustic sources by looking only at the AVGPR results. FIG. 11b presents the corresponding WISPR and DELTA curves for the same test data. The WISPR curve in FIG. 11b shows an increase in the signal excess at S1 and S2. The FIG. 11b curve for DELTA identifies only the two signals which have DELTA values below the preset 1.5 dB threshold. The two points on the DELTA curve which drop below the 1.5 dB dotted line threshold also clearly indicate that the two signals marked as S1 and S2 are low amplitude fluctuation signals.

The bottom curve in FIG. 11c presents the results of the WSC $\Phi^{16}$ processor, where a 10 dB threshold level is shown as a dotted line. The top curve in FIG. 11c shows the curve for WISPR SC $\Phi^{16}$, which is a result of dividing the WISPR value by the [WSC $\Phi^{16}]^G$ value for G equal to 1. Two low amplitude fluctuation signals are apparent in the results for the WISPR SC $\Phi^{16}$ processor of FIG. 11c (only results above 20 dB are plotted, for clarity), along with several other signals which have not been completely attenuated at frequency bins of about 110, 520 and 530. Similarly, the WSC $\Phi^{16}$ results presented in the bottom curve of FIG. 11c shows only two points with WSC $\Phi^{16}$ values below the 10 dB threshold. By comparing the WSC $\Phi^{16}$ curve of FIG. 11c with the DELTA curve of FIG. 11b, it is clear that WSC $\Phi^{16}$ is a superior indicator of a low amplitude fluctuation signal.

FIG. 11c also illustrates how an operator can evaluate the effectiveness of a selected detection threshold. Because the two signals S1 and S2 which appear below the detection threshold of the WSC $\Phi^{16}$ curve correspond to two known underwater acoustic sources, the WSC $\Phi^{16}$ detection threshold of 10 dB is considered adequate. If the known small phase fluctuation signals did not appear on the WSC $\Phi^{16}$ curve, the threshold could be adjusted by a user to identify more (or fewer) suspected small phase fluctuation (SPF) signals, depending on the tolerance for false alarms.

Figure 12A:
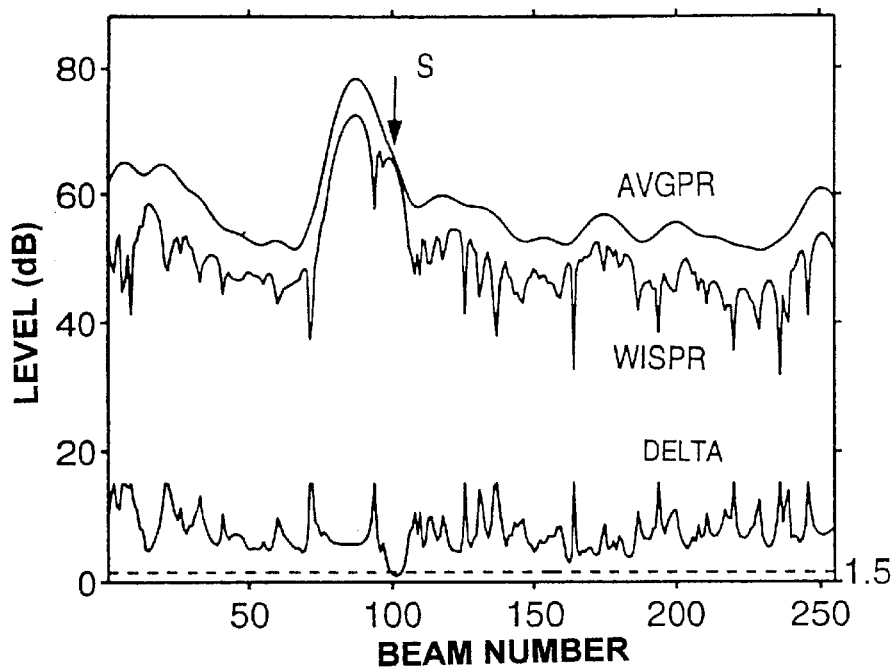
FIGS. 12a, 12b, and 12c are plots of: plots of AVGPR, WISPR, DELTA; AVGPR, WISPR SC $[2\Phi]^4$, and WSC $[2\Phi]^4$; and AVGPR, WISPR SC $\Phi^{16}$, and WSC $\Phi^{16}$.
Figure 12B:
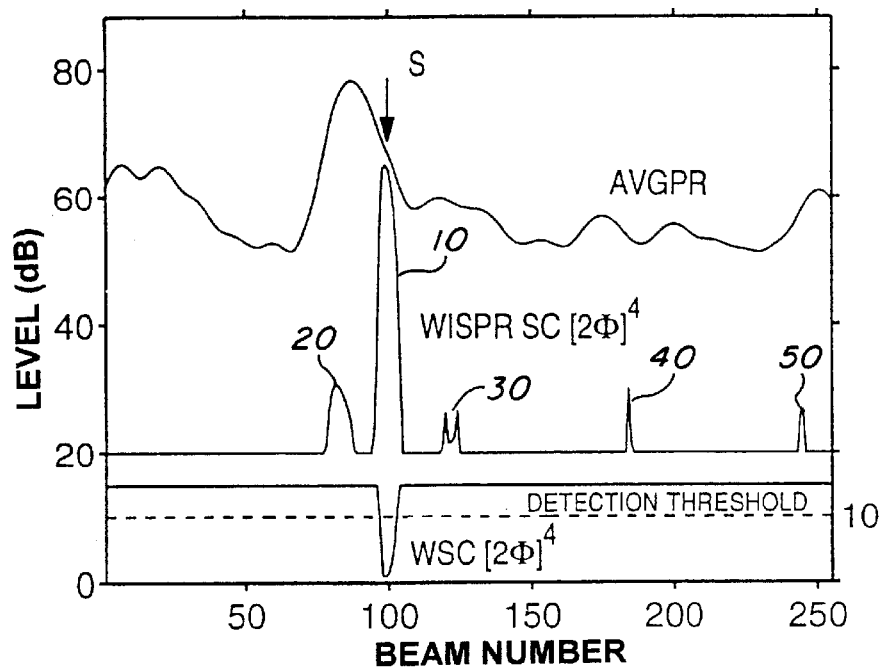
Figure 12C:
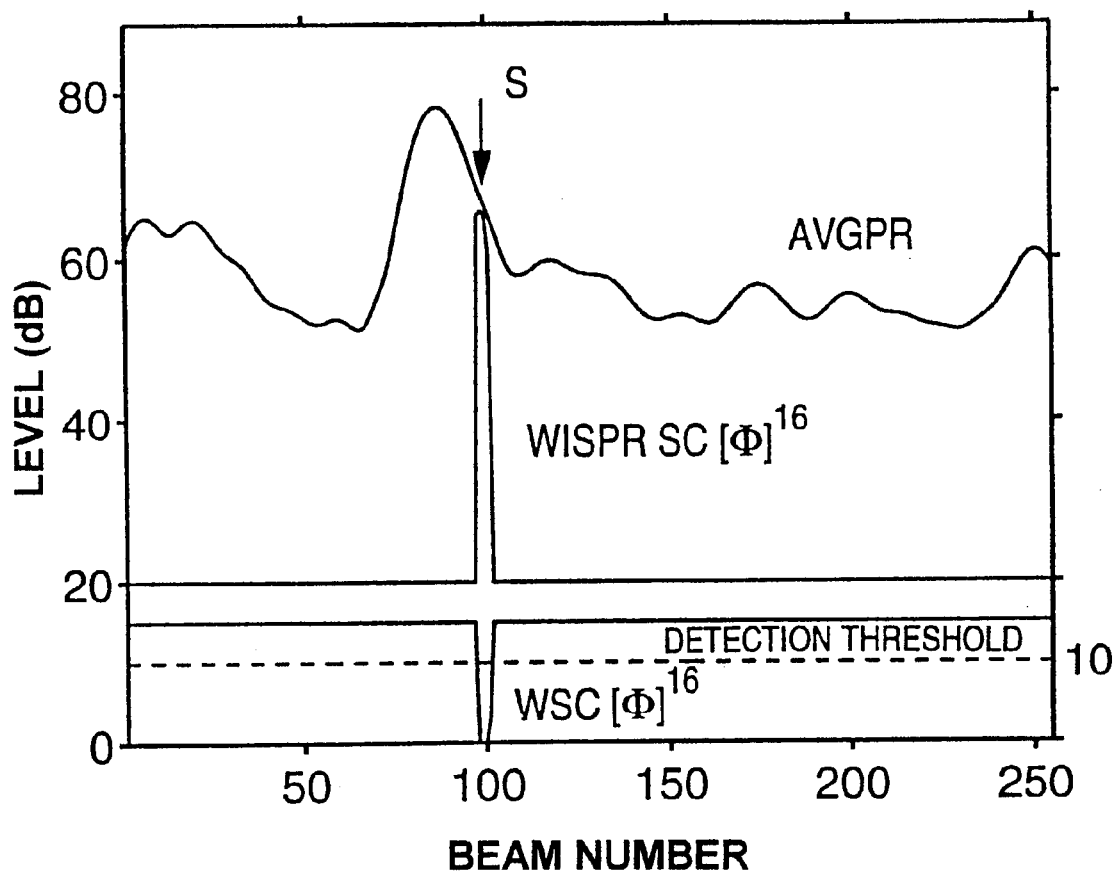

For another comparison between the AVGPR, WISPR, DELTA, WISPR SC, and WSC processors, refer to FIGS. 12a, 12b, and 12c, in which the results of the processors are plotted against the beam number at the frequency of the signal at which the submerged source signal appears. The "S" in FIGS. 12a, 12b, and 12c indicates the spatial location (i.e. beam number) at which a signal is detected. FIG. 12a presents the AVGPR, WISPR, and DELTA curves. FIG. 12b presents the AVGPR, WISPR SC $[2\Phi]^4$, and WSC $[2\Phi]^4$ curves, and FIG. 12c presents the AVGPR, WISPR SC $\Phi^{16}$, and WSC $\Phi^{16}$ curves for the same test data.

Note that a great deal of noise is present in the AVGPR, WISPR, and DELTA curves of FIG. 12a. The WISPR SC $[2\Phi]^4$ and WSC $[2\Phi]^4$ processors shown in FIG. 12b show much better results in attenuating noise and clutter while emphasizing signals. Referring to FIG. 12b, a few noise and clutter signals survive the WISPR SC $[2\Phi]^4$ process. All noise, however, is attenuated by the WSC $[2\Phi]^4$ processor of FIG. 12b, as well as by the WISPR SC $\Phi^{16}$ and WSC $\Phi^{16}$ processors of FIG. 12c. These plots indicate that applying a WSC processor to acoustic hydrophone data substantially enhances the signal to noise ratio for small phase fluctuation signals and attenuates the noise and clutter signals having large phase fluctuations.

Notice that compared to the WSC $[2\Phi]^4$ plot of FIG. 12b, the WSC $\Phi^{16}$ processor of FIG. 12c has better spatial resolution of signals (the spike at beam #100 is considerably narrower for FIG. 12c than for FIG. 12b). Improving the spatial resolution is a prime advantage of increasing the exponent L in Equation (3). Similarly, increasing the exponent L also increases the spatial resolution of the WISPR SC processors. This is seen by comparing the width of the spike in the WISPR SC $\Phi^{16}$ results of FIG. 12c with the WISPR SC $[2\Phi]^4$ results of FIG. 12b.

Figure 13A:
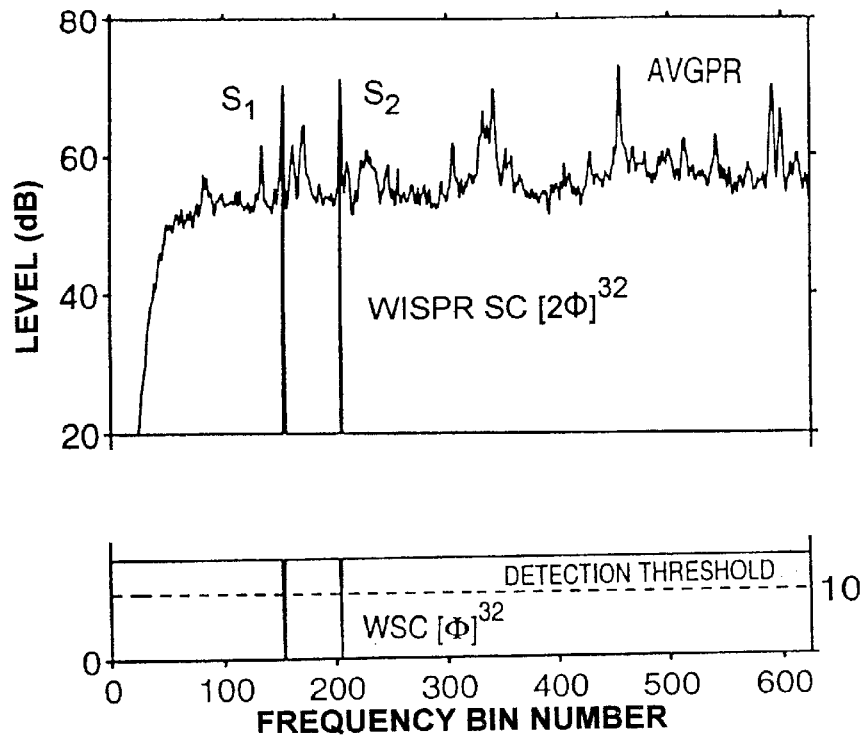
FIGS. 13a and 13b are plots of AVGPR, WISPR SC $\Phi^{32}$, and WSC $\Phi^{32}$.
Figure 13B:
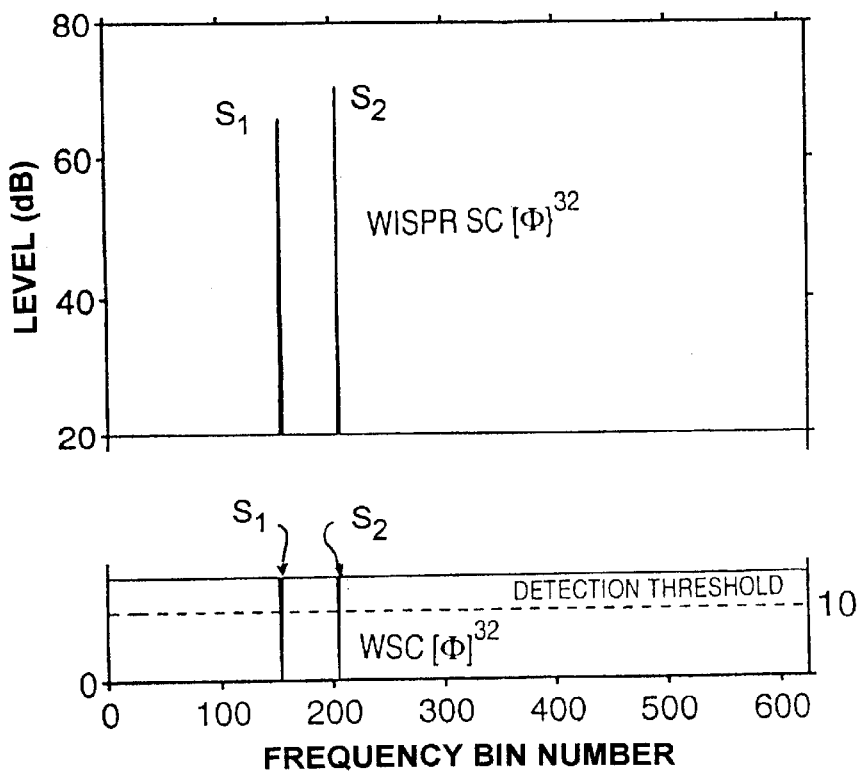

Increasing the exponent L also increases the attenuation of noise and clutter signals by WISPR SC and WSC processors. FIGS. 13a, 13b, 14a, and 14b compare the results of processors based on $[2\Phi]^4$, $\Phi^{16}$, and $\Phi^{32}$. Two known submerged source signals are designated as S1 and S2 in FIGS. 13a, 13b, 14a, and 14b. In the top AVGPR curve of FIG. 13a, both S1 and S2, as well as noise and clutter signals, appear. In contrast, the curves in FIG. 13a show that the WISPR SC $\Phi^{32}$ and WSC $\Phi^{32}$ processors filter all the noise and clutter signals, leaving only responses at S1 and S2 to indicate the presence of low phase fluctuation signals of interest. This is even more apparent in FIG. 13b, in which only the WISPR SC $\Phi^{32}$ and WSC $\Phi^{32}$ curves are shown.

Figure 14A:
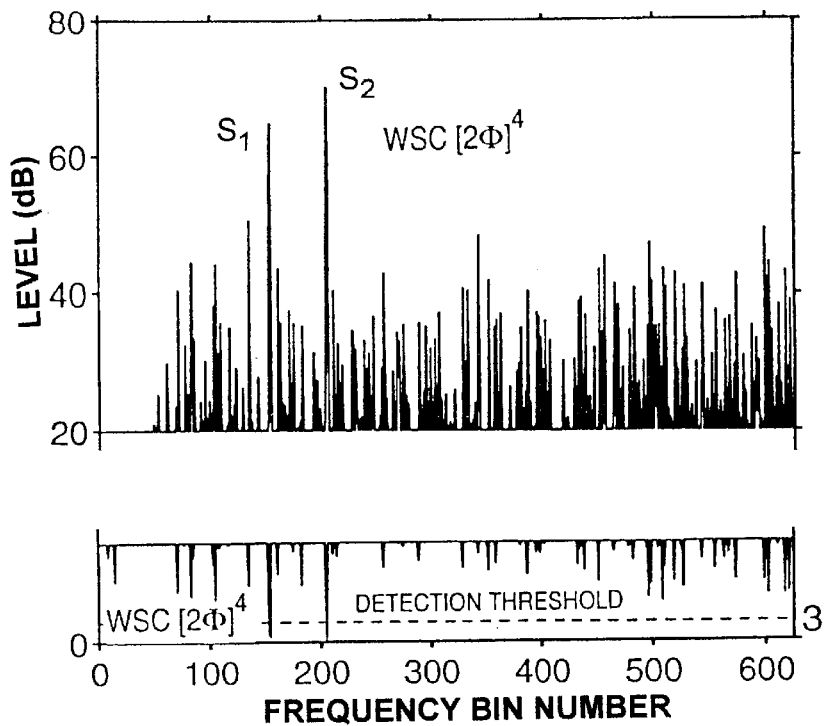
FIGS. 14a and 14b are plots of WISPR SC $[2\Phi]^4$, WSC $[2\Phi]^4$, WISPR SC $\Phi^{16}$ and WSC $\Phi^{16}$ corresponding to FIGS. 13a and 13b.
Figure 14B:
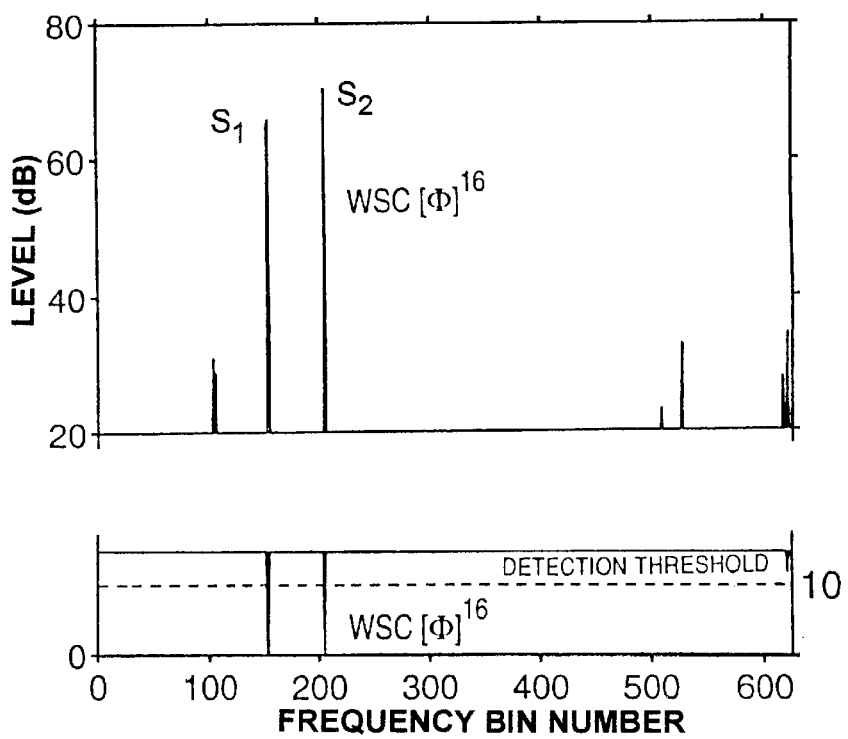

Referring next to FIG. 14a, notice that the curve for the WSC $[2\Phi]^4$ processor contains significantly reduced noise (by more than 2 to 20 dB), along with the S1 and S2 signals (attenuated less than 5 dB compared to the FIG. 13a values). By inspection, it is clear that the WSC $[2\Phi]^4$ processor in FIG. 14a does not attenuate the noise and signal as much as the WSC $\Phi^{16}$ processor shown in FIG. 14a, or as much as the W $\Phi^{32}$ processor shown in FIG. 13b. A lower detection threshold for WSC $[2\Phi]^4$ was chosen (3 dB, compared to 10 dB for WSC $\Phi^{16}$ in FIG. 14b and for WSC $\Phi^{32}$ in FIG. 13b), in order to partially compensate for the smaller amount of noise and clutter attenuation of the WSC $[2\Phi]^4$ processor compared to the other two processors.

It is evident from the results in the various plots of FIGS. 13 and 14 that as the exponent on the excess phase angle $\Phi_i$ increases, the signal to noise ratio of the signals with phase fluctuation that are less than those of the noise also increases and detection becomes easier and more obvious. One can apply the above methods to any time series of complex numbers having a real and quadrature component, as long as the phase component of the complex number is maintained in sequence. These methods can be applied to unprocessed data, or to data which has undergone some preliminary processing.

The invention has been described in what is considered to be the most practical and preferred embodiments. It is recognized, however, that obvious modifications to these embodiments may occur to those with skill in this art. According, the scope of the invention is to be discerned from reference to the appended claim, wherein:

What is claimed is:

1. A method for processing an input signal, comprising the steps of: receiving a sampling of said signal in the form of a time series of complex data, said time series having data vectors $R_i$ for i=1 to N, wherein N=the total number of said data vectors, each data vector member having a real amplitude $r_i$ and a complex part $e^{j\theta_i}$, where $\theta_i$ is the phase of said $R_i$, estimating the excess phase rotation $\Phi_i$, and calculating WSC, a measure of phase fluctuation, as $$WSC = \left[\frac{1}{M}\sum_{i=3}^{N} B[C\Phi_i]^L\right],$$

wherein B, C, L, and M are real numbers.

2. A method as in claim 1, wherein said estimating of said excess phase rotation $\Phi_i$ comprises calculating $\Phi_i$ as $\Phi_i = \theta_i - 2\theta_{i-1} + \theta_{i-2}$ wherein $\theta_{i-1}$ is the phase angle of the i−1th vector and $\theta_{i-2}$ is the phase angle of the i−2th vector.

3. A method as defined in claim 1, further comprising comparing said calculated value of WSC with a preselected threshold value.

4. A method as in claim 1, wherein B is about 2, C is about 1, and L is about 4.

5. A method as in claim 1, wherein B is about 1, C is about 1, and L is about 16.

6. A method as in claim 1, wherein B is about 1, C is about 1, and L is about 32.

7. A method as in claim 1, further comprising:

receiving a quantity which is the result of another signal processing step, and dividing said quantity by said calculated value of WSC raised to an exponent G, wherein WSC raised to an exponent G is a spectrum enhanced output and G is a real number.

8. A method as in claim 7, wherein G is about 1.

9. A method as in claim 7, wherein said quantity is an estimate of said amplitude of said data vectors.

10. A method as in claim 7, wherein said quantity is an incoherent average of said amplitudes of said data vectors.

11. A method as in claim 10, wherein G is about 1.

12. A method as in claim 10, wherein said incoherent average of said amplitudes of said data vectors is calculated as $$AVGPR = \frac{1}{N-2}\sum_{i=3}^{N} r_i^K,$$

wherein AVGPR is an average signal power and K is a positive real number.

13. A method as in claim 12, wherein K is about 2.

14. A method as in claim 7, wherein said quantity is an estimate of the amount of fluctuation in said amplitude of said data vectors.

15. A method as in claim 14, wherein G is about 1.

16. A method as in claim 1, further comprising estimating the amount of fluctuation in said amplitude of said data vectors as:

$$WISPR = \left[\frac{1}{M}\sum_{i=3}^{N} r_i^{-2}\right]^{-1},$$

wherein M is a real number.

17. A method as in claim 16, further comprising:
calculating a quantity WISPR SC according to WISPR SC=WISPR/[WSC$^G$], wherein WISPR SC represents a spectrum output of Wagstaff's integration silencing processor semi-coherent and G is a real number.

18. A method as defined in claim 17, further comprising comparing the calculated value of WISPR SC with a preselected threshold value.

19. A method for distinguishing signal from noise, comprising
receiving a sampling of said signal in the form of a time series of complex data, said time series having data vectors $R_i$ for i=1 to N,
wherein N=the total number of said data vectors,
each data vector having a real amplitude $r_i$ and a complex part $e^{j\Theta i}$, where $\theta_i$ is the phase of said data vector $R_i$,
calculating DELTA=AVGPR/WISPR, wherein DELTA is a measure of amplitude fluctuation, $$\frac{1}{N-2}\sum_{i=3}^{N} r_i^K,$$

AVGPR is equal to $$\left[\frac{1}{M}\sum_{i=3}^{N} r_i^{-2}\right]^{-1},$$

WISPR is equal to
and wherein K and M are real numbers.

20. A signal filter, said filter being effective to receive samples of a signal in the form of a time series of complex data, said time series having data vector members $R_i$ for i=1 to N,
wherein N=the total number of data vectors,
each data vector having a real amplitude $r_i$ and an imaginary part $e^{j\Theta i}$, where $\theta_i$ is the phase of said $R_i$,
said filter comprising:
means for estimating excess phase rotation $\Phi_i$ and means for calculating WSC as $$WSC = \left[\frac{1}{N-2}\sum_{i=3}^{N} B[C\Phi_i]^L\right],$$

wherein B, C, and L are real numbers.

21. A signal filter as in claim 20, wherein said means for estimating the excess phase rotation $\Phi_i$ is according to $$\Phi_i = \theta_i - 2\theta_{i-1} + \theta_{i-2}$$

wherein $\theta_{i-1}$ is the phase angle of the i−1th vector and $\theta_{i-2}$ is the phase angle of the i−2 th vector.

22. A signal filter as defined in claim 1, further comprising comparing means for comparing the calculated value of WSC with a preselected threshold value.

23. A signal filter as in claim 1, wherein B is about 2, C is about 1, and L is about 4.

24. A signal filter as in claim 1, wherein B is about 1, C is about 1, and L is about 16.

25. A signal filter as in claim 1, wherein B is about 1, C is about 1, and L is about 32.

26. A signal filter as in claim 1, further comprising a data input structure for receiving a quantity which is the result of another signal processing step, and calculating means for dividing said quantity by the calculated value of WSC raised to an exponent G, wherein G is a real number.

27. A signal filter as in claim 26, wherein G is about 1.

28. A signal filter as in claim 20, further comprising means for dividing a quantity which is an estimate of said amplitude of said data vectors by said calculated value of WSC raised to a real exponent G.

29. A signal filter as in claim 20, further comprising means for dividing a quantity which is the incoherent average of said amplitudes of said data vectors by said calculated value of WSC raised to a real exponent G.

30. A signal filter as in claim 29, wherein said incoherent average of said amplitudes of said data vectors is calculated according to $$AVGPR = \frac{1}{N-2}\sum_{i=3}^{N} r_i^K,$$

and K is a positive real number.

31. A signal filter as in claim 30, wherein K is about 2.

32. A signal filter as in claim 30, further comprising means for dividing an estimate of the amount of fluctuation in said amplitude of said data vectors by said calculated value of WSC raised to said real exponent G.

33. A signal filter as in claim 32, wherein said estimate amount of fluctuation in said amplitude of said data vectors is calculated as:

$$WISPR = \left[\frac{1}{M}\sum_{i=3}^{N} r_i^{-2}\right]^{-1},$$

wherein M is a real number.

34. A signal filter as defined in claim 33, further comprising means for comparing the result of dividing said estimate of said fluctuation of said amplitude of said data vectors by the value of WSC raised to a real exponent G with a preselected threshold value.

35. A signal filter, comprising:

means for receiving a sampling of said signal in the form of a time series of complex data, said time series having data vector members $R_i$ for i=1 to N, wherein N=the total number of said data vectors, each data vector having a real amplitude $r_i$ and an complex part $e^{j\theta_i}$, where $\theta_i$ is the phase of said $R_i$, means for calculating DELTA=AVGPR/WISPR, wherein $$AVGPR = \frac{1}{N-2} \sum_{i=3}^{N} r_i^K,$$

$$WISPR = \left[\frac{1}{M} \sum_{i=3}^{N} r_i^{-2}\right]^{-1},$$

and wherein K and M are real numbers.

* * * * *

UNITED STATES PATENT AND TRADEMARK OFFICE
CERTIFICATE OF CORRECTION

PATENT NO.    : 6,418,083 B1
DATED         : July 9, 2002
INVENTOR(S)   : Ronald A. Wagstaff & Jackson A. Mobbs It is certified that error appears in the above-identified patent and that said Letters Patent is hereby corrected as shown below:

<u>Column 13,</u>
Lines 52-62, "

$$\frac{1}{N-2}\sum_{i=3}^{N} r_i^K,$$

AVGPR is equal to $$\left[\frac{1}{M}\sum_{i=3}^{N} r_i^{-2}\right]^{-1},$$

WISPR is equal to   "

should read   -- AVGPR is equal to $\frac{1}{N-2}\sum_{i=3}^{N} r_i^K,$

WISPR is equal to $\left[\frac{1}{M}\sum_{i=3}^{N} r_i^{-2}\right]^{-1},$  --

Signed and Sealed this

Twenty-sixth Day of November, 2002

Attest:

*Attesting Officer*

JAMES E. ROGAN
*Director of the United States Patent and Trademark Office*